United States Patent [19]

Andrianoff et al.

[11] Patent Number: 5,488,884
[45] Date of Patent: Feb. 6, 1996

[54] METHOD AND APPARATUS FOR SIDE-GRINDING SAW BLADE TEETH

[75] Inventors: Fredric B. Andrianoff; Danny E. Hockert, both of Portland; Larry A. McMaster, Boring, all of Oreg.

[73] Assignee: Armstrong Manufacturing Company, Portland, Oreg.

[21] Appl. No.: 224,486

[22] Filed: Apr. 7, 1994

[51] Int. Cl.⁶ .................................................... B23D 63/12
[52] U.S. Cl. ...................................................... 76/41; 76/37
[58] Field of Search .................................. 76/37, 41, 72, 76/78.1, 79.5, 39, 40, 75; 451/192, 203, 229

[56] References Cited

U.S. PATENT DOCUMENTS

| | | |
|---|---|---|
| Re. 26,676 | 9/1969 | Anderson et al. . |
| 510,210 | 12/1993 | Toomer . |
| 667,924 | 2/1901 | Schofield et al. . |
| 971,841 | 10/1910 | Hibbert . |
| 2,379,642 | 7/1945 | Kiechle ........................... 76/41 |
| 2,393,300 | 1/1946 | Denton . |
| 2,623,414 | 12/1952 | Senard . |
| 3,611,839 | 10/1971 | Idel ............................... 76/41 X |
| 3,919,900 | 11/1975 | Allen et al. . |
| 4,018,109 | 4/1977 | Stier . |
| 4,023,446 | 5/1977 | Annas et al. . |
| 4,098,149 | 7/1978 | Wright . |
| 4,238,977 | 12/1980 | Annas et al. ..................... 76/40 |
| 4,366,728 | 1/1983 | Beck et al. . |
| 4,426,894 | 1/1984 | Nicolodi . |
| 4,577,533 | 3/1986 | Lenard et al. . |
| 4,685,845 | 8/1987 | Emter . |
| 4,747,607 | 5/1988 | Emter . |
| 4,750,387 | 6/1988 | Swiger . |
| 4,819,515 | 4/1989 | Pfaltzgraff . |
| 4,823,649 | 4/1989 | Emter . |
| 4,846,023 | 7/1989 | Emter . |
| 4,852,430 | 8/1989 | Oppliger et al. . |
| 4,864,896 | 9/1989 | Pfaltzgraff . |
| 4,901,604 | 2/1990 | Emter . |
| 5,048,236 | 9/1991 | Williams ..................... 76/77 X |
| 5,295,418 | 3/1994 | Emter ............................ 76/37 |

FOREIGN PATENT DOCUMENTS

| | | |
|---|---|---|
| 73.17343 | 5/1973 | France . |
| 3313160C1 | 4/1983 | Germany . |

OTHER PUBLICATIONS

Brochure: Southern Lumberman, The Sawmill Magazine, Simonds, Nov. 1992.
Brochure: No. 81 Armstrong Band Saw Bench, No. 81–36 Armstrong Single Block Bench, with Overhead Saw Support, circa 1990.
Page from Feature, Sawshop Toolroom, including photograph of "The Alligator 'MAP' Bandsaw Leveling Machine", circa 1992.
Brochure: Original Vollmer GF 10 U, circa 1989.

*Primary Examiner*—Douglas D. Watts
*Attorney, Agent, or Firm*—Klarquist Sparkman Campbell Leigh & Whinston

[57] ABSTRACT

A grinding apparatus for side grinding the cutting teeth of band saw blades, in which the band saw blade is oriented in a vertical loop. The apparatus is controlled by a programmable controller and includes redundant indexing mechanisms capable of feeding both right-handed and left-handed saw blades past dual, opposed side grinding elements that side grind the working portion of the sawtooth to predetermined radial and tangential clearance angles and desired dimensions.

32 Claims, 16 Drawing Sheets

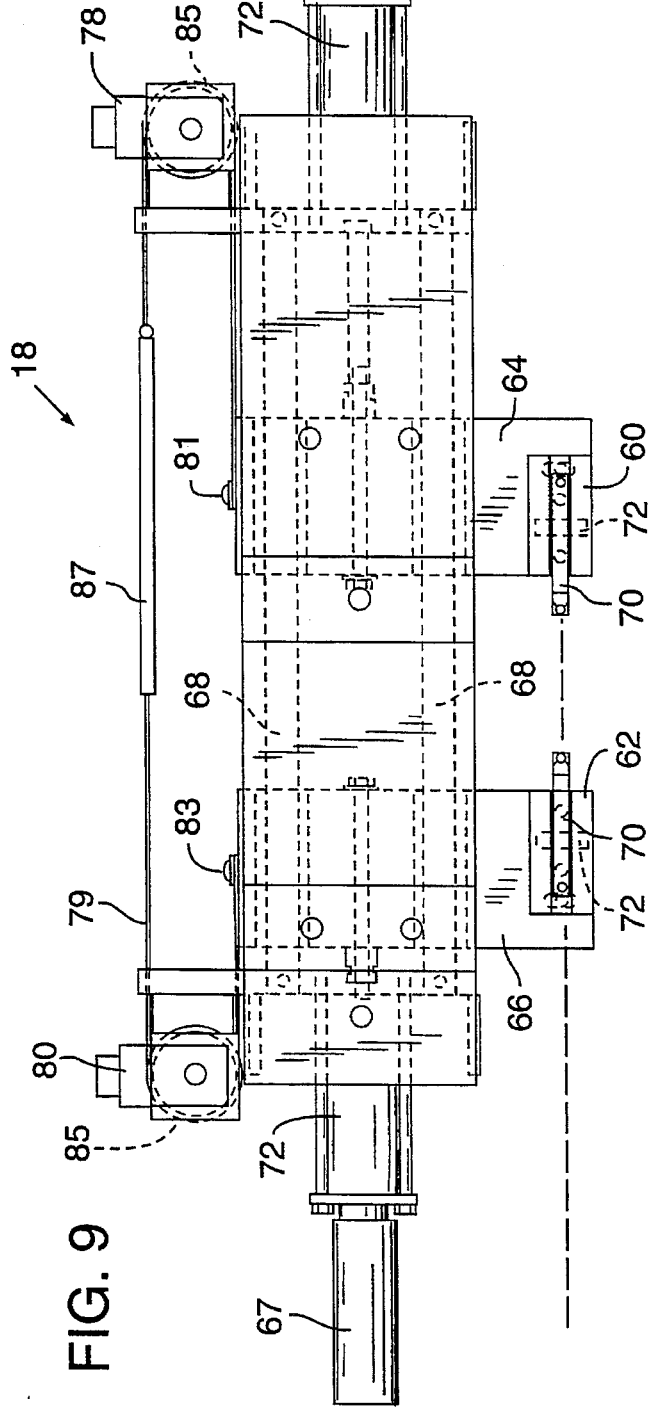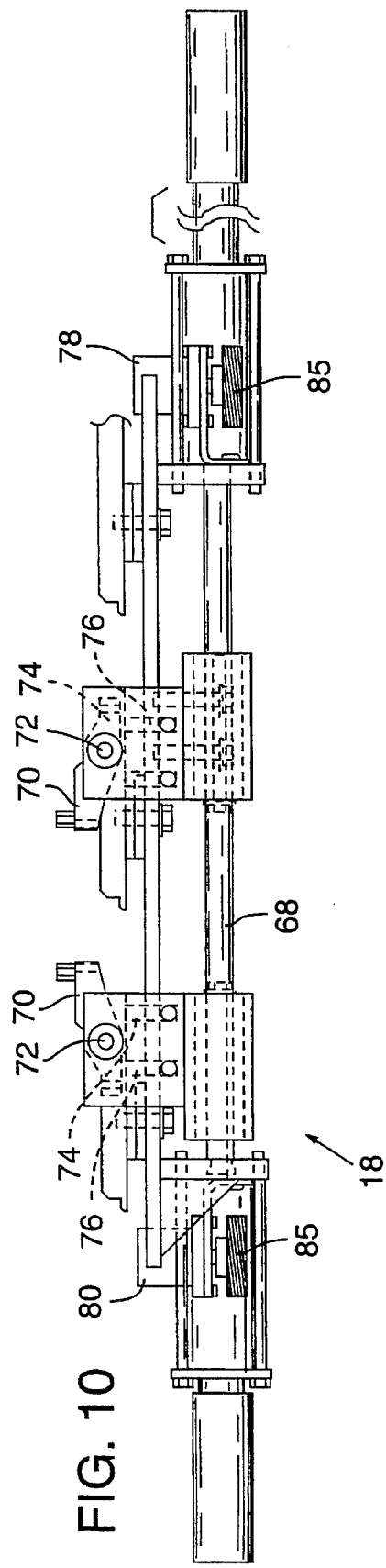
FIG. 9
FIG. 10

5,488,884

METHOD AND APPARATUS FOR SIDE-GRINDING SAW BLADE TEETH

This invention generally relates to an apparatus for sharpening saw blades, and more particularly to an apparatus for side-grinding saw teeth on band saw blades.

BACKGROUND OF THE INVENTION

Saw blades for cutting wood, metal, and the like often have a plurality of teeth cut into the outer edge of the blade. In many cases, the saw blade teeth are tipped with a hard material, such as carbide, or cobalt alloys such as STEL-LITE to reduce wear and to maintain sharpness.

When a sawtooth is tipped with carbide or some other hard metallic material, the tip of the tooth is oversized and must be ground to desired dimensions and tangential and radial clearance angles for cutting the proper kerf. The tangential clearance angle is viewed from above the tooth and measures the inward taper of the tooth from the tooth face rearward. The radial clearance angle is viewed from the face of the tooth and measures the inward taper from the tooth top toward the blade.

The teeth of both circular saw blades and band saw blades may be tipped with hard material, and must be ground to the proper dimensions. Band saws comprise an endless blade loop that has saw teeth cut into one or both sides of the outer edge or edges of the blade. All band saws are "handed." That is, the teeth are cut into the outer edges of the band saw such that the saw cuts a work piece as the blade moves in one direction or the other relative to the work piece. A "right-handed" band saw has teeth cut into the outer edge of the blade such that the teeth cut when the blade moves in one direction; a "left-handed" band saw blade has teeth cut into the outer edge of the blade such that the teeth cut when the blade moves in the opposite direction.

As used herein, the designation of a band saw as being either "right-handed" or "left-handed" is arbitrary. For example, a right-handed band saw could be defined as a saw that cuts when the band saw loop rotates in the clockwise direction. Maintaining the same orientation, a left-handed blade would thus be defined as a saw that cuts when the band saw loop rotates in the counterclockwise direction. Band saws that have teeth formed on only one side of the blade are referred to as single cut blades.

Some band saws have teeth cut into both outer edges of the blade loop. These band saws are commonly called double cut blades, or double cuts. With double cuts the teeth on each outer edge of the band saw cut the work piece when the blade rotates in one direction. Thus, a double cut band saw will cut a work piece, wood for example, as the wood is moved past the blade from either direction. However, for purposes of reference for side grinding the teeth, on one side of a double cut band saw the teeth are right-handed; the teeth on the opposite side of the blade are necessarily left-handed.

In most cases, prior apparatus for grinding tipped band saw teeth to proper dimension and clearance angles grind the teeth with the band saw loop oriented horizontally. Thus, the band saw blade is oriented on the grinding machine with the width dimension of the band vertical and the saw teeth extending upwardly. For purposes of reference herein, horizontal orientation of a band saw refers to the orientation just described wherein the width dimension of the band is in the vertical direction and the saw teeth extend upwardly. In contrast, as used herein, vertical orientation of the band saw loop refers to a band saw in which the width dimension of the band is in the horizontal orientation and the saw teeth extend horizontally.

With horizontally oriented prior grinding machines, a pair of grinding wheels operates to successively grind each tooth on the band saw as the teeth are successively moved past the grinding heads. These machines typically require a large amount of floor space since the band saw blade loop is laid out horizontally. Moreover, the space requirements are essentially doubled if the sawmill is using both right and left-handed blades or a double cut saw blade because a left-handed blade must be positioned on the opposite side of the grinding head than a right-handed blade would be.

Another drawback of prior side grinding machines is the amount of equipment that must be used to support the band saw blade. While the grinding heads of such machines typically have equipment to support that portion of the band saw blade near the heads, the back side of the blade loop must be supported by additional post brackets.

Additionally, most horizontal side grinders require a separate, powered or mechanical back-feed device to feed the band to and past the grinding heads. Thus, because indexing the band past the grinding heads requires a fair amount of force when the band is horizontally oriented, a separate back-feed must often be purchased, and the back-feed must be somewhat timed to the indexing mechanism on the grinding heads.

Finally, although side grinders such as those discussed below are capable of grinding either right-handed or left-handed blades, on many occasions a sawmill will purchase two separate grinding machines, one dedicated to right-handed band saw blades, and the other dedicated to left-handed blades to save on the amount of time needed to convert the machine from right-handed operation to left-handed operation. Thus, prior art side grinding machines did not include redundant indexing systems capable of feeding a right-handed saw blade in a first direction, and a left-handed saw blade in a second direction with either blade mounted in the same position on the machine. The use of two separate machines not only adds cost, but requires even more floor space than would be required if a single side grinder is used to grind both right- and left-handed blades.

U.S. Pat. No. 4,819,515 to Pfaltzgraff, which is assigned to the assignee of the present application, is an example of a side grinding machine that operates on horizontally oriented blade loops. Pfaltzgraff teaches an apparatus for grinding saw teeth in a saw blade wherein the tip of each tooth is independently measured and ground before advancing successively each tooth on the saw blade for grinding.

The Pfaltzgraff apparatus, which is operated under the control of a programmable controller, is capable of grinding both left-handed and right-handed band saw blades. However, the saw blade is laid out in a horizontal loop with the teeth extending upwardly so that the saw teeth are indexed past the grinding heads, which move vertically downwardly to grind each tooth. Right-handed blades are oriented in a loop on one side of the grinding heads, and left-handed blades are oriented on the other side. If only one side grinding machine is used, this essentially creates a figure eight pattern, with the associated work space dedicated to the operation being about twice as great as would be required if the apparatus were dedicated solely to grinding blades of the same hand.

In addition, with the Pfaltzgraff machine, the band saw must be supported by numerous separate post brackets positioned on the back side of the blade loop. A back-feed apparatus is also necessary to keep the band saw indexing properly. This added equipment adds cost and requires additional floor space.

Finally, moving band saw blades into working positions on any kind of side grinding apparatus can be difficult. These difficulties are especially pronounced on grinders in which the band saw is oriented horizontally. With the Pfaltzgraff machine, manipulating the band saw blade into working position is difficult since the entire band must be lifted over the grinding heads. Band saws for cutting raw lumber are often very large and heavy; lifting such a blade onto and off of a grinding machine typically requires the efforts of at least two people. In addition, teeth on a band saw that have been tipped with a hard material can be quite sharp, even before grinding. As such, it is desirable to reduce the amount of manual handling of band saws.

U.S. Pat. No. 4,023,446 to Annas et al. teaches a vertically oriented band saw profile grinder. A profile grinder grinds the inner or forward face of a saw tooth, contrasted to a side grinder that grinds the tangential and radial clearance angles. In Annas et al., a pair of grinders are oriented to grind the teeth on two band saw blades that are suspended from overhead supports in vertical, downwardly directed loops. The band saw blades are looped over and hang down from opposite wheels, and the grinders are positioned below the wheels in position to grind the teeth as the blades are indexed vertically into the grinding position. The indexing system of Annas et al. is incapable of indexing both right- and left-handed saw blades past the same grinding head.

Another band saw side grinder that grinds horizontally oriented band saw blades is disclosed in U.S. Pat. No. 4,418,589 to Cowart, Sr. Like Pfaltzgraff, Cowart, Sr. teaches the use of a programmable controller for supervising the grinding of saw blade teeth, in which the travel of opposed grinding wheels is controlled by precision limit switches.

From the forgoing it will be recognized that all of the prior art apparatuses for side grinding the teeth of a band saw blade suffer from a variety of drawbacks which include the requirements of large floor space dedicated to side grinding, additional support and back-feed equipment, and difficulties associated with handling and positioning the band saw in a working position on the grinding apparatus. Additionally, none of the prior art side grinders are capable of side grinding the teeth of both right-hand and left-hand saw blades, and double cut blades, without changing the position of the blade relative to the grinding heads and thereby effectively at least doubling the space and back support requirements of these grinding apparatus. As such, these prior art apparatuses are poorly suited to simple, economical grinding operations.

SUMMARY OF THE INVENTION

An object of the invention, therefore, is to provide a method and apparatus for side grinding the teeth of band saw blades that overcome the drawbacks found in the prior art.

Another object of the present invention is to provide a method and apparatus for side grinding band saw teeth while the blade is oriented in a vertical loop, thereby providing significant floor space and equipment savings.

Yet another object is to provide a method and apparatus as aforesaid that enable side grinding of both right-handed and left-handed blades with the same machine with only minor adjustments and without requiring additional floor space.

Another object is to provide a method and apparatus as aforesaid that ease and simplify and improve the handling, support and feed of the band saw blades in preparation for and during the side grinding operation.

Still another object is to provide an apparatus as aforesaid that can be manufactured at a lower cost than prior side grinders.

In the preferred embodiment, the foregoing objectives are carried out with an apparatus and method that orient a band saw blade in a vertical loop such that dual, opposed grinding wheels with their axes horizontal, move horizontally against opposite sides of a horizontally directed tipped tooth after the tooth is automatically indexed into its grinding position and the blade is clamped in position on a horizontal work surface. The apparatus includes separate indexing systems, one for feeding teeth of right-handed saw blades in one direction into a first grinding position, and the other for feeding teeth of left-handed saw blades in the opposite direction into a second grinding position. The grinding wheels are preset to side grind predetermined tangential and radial clearance angles of each tooth of a band saw.

In sequence, (1) a tooth is advanced to grinding position, (2) the blade is clamped to stabilize the tooth, (3) the grinding wheels approach the tip of the tooth horizontally until one grinding wheel grinds the upper side of the tooth and the other grinding wheel grinds the lower side of the same tooth to the correct clearance angles, (4) the grind wheels withdraw vertically away from the tip, (5) the grind wheels withdraw horizontally from the tooth, and (6) the clamps release the blade. The cycle is repeated until all teeth on the blade are side ground. The apparatus includes a programmable controller to control the described functions in the proper sequencing.

The foregoing and other objects, features and advantages of the present invention will be more readily apparent from the following detailed description of a preferred embodiment thereof, which proceeds with reference to the accompanying drawings.

BRIEF DESCRIPTION OF THE DRAWINGS

FIG. 9 is a top view of the indexing assembly.

FIG. 10 is a side, partially cut-away view of the indexing assembly shown in FIG. 9.

DETAILED DESCRIPTION OF A PREFERRED EMBODIMENT

Figure 2:
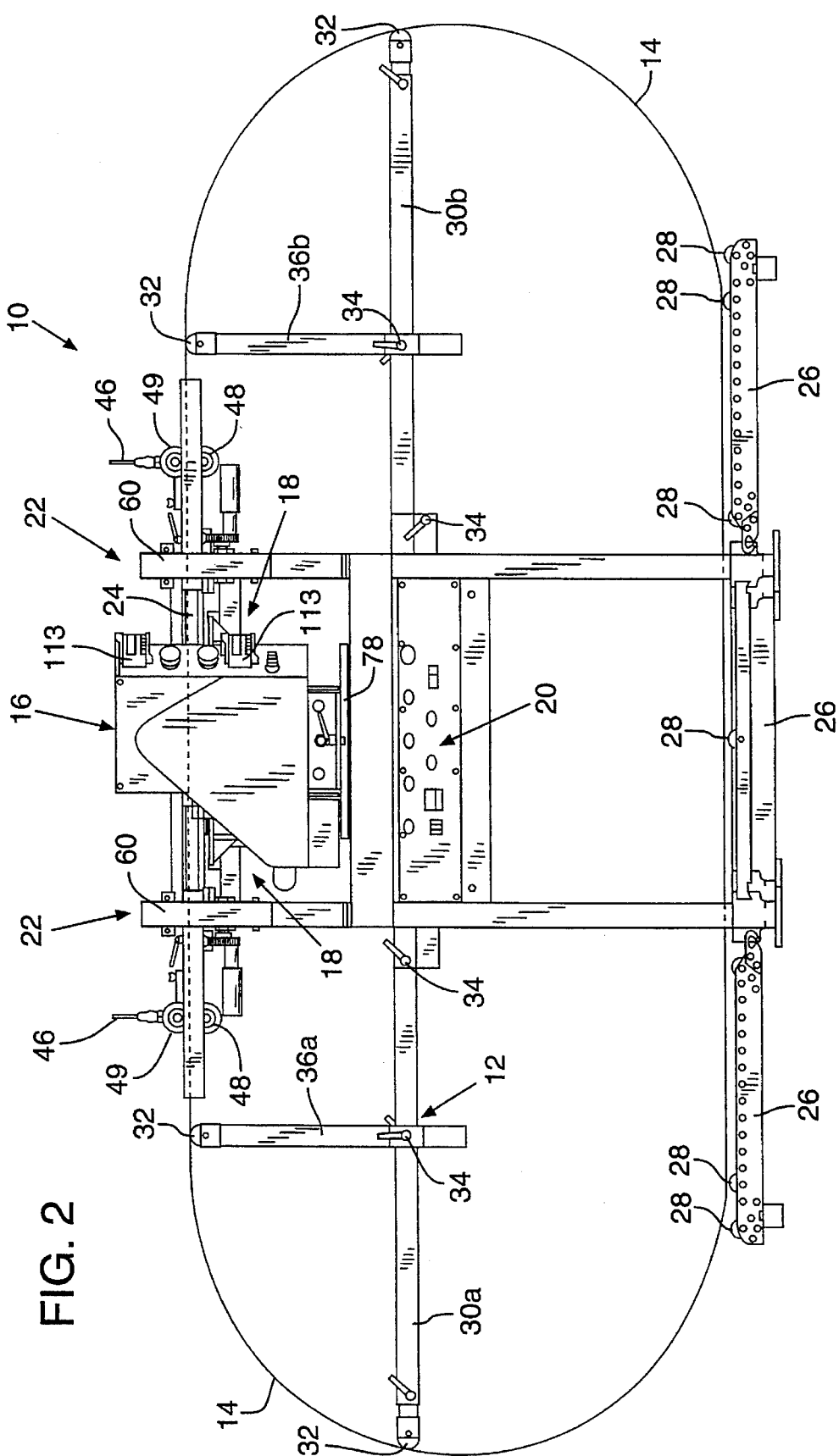
FIG. 2 is a front elevation view of the grinding apparatus according to the invention.
Figure 3:
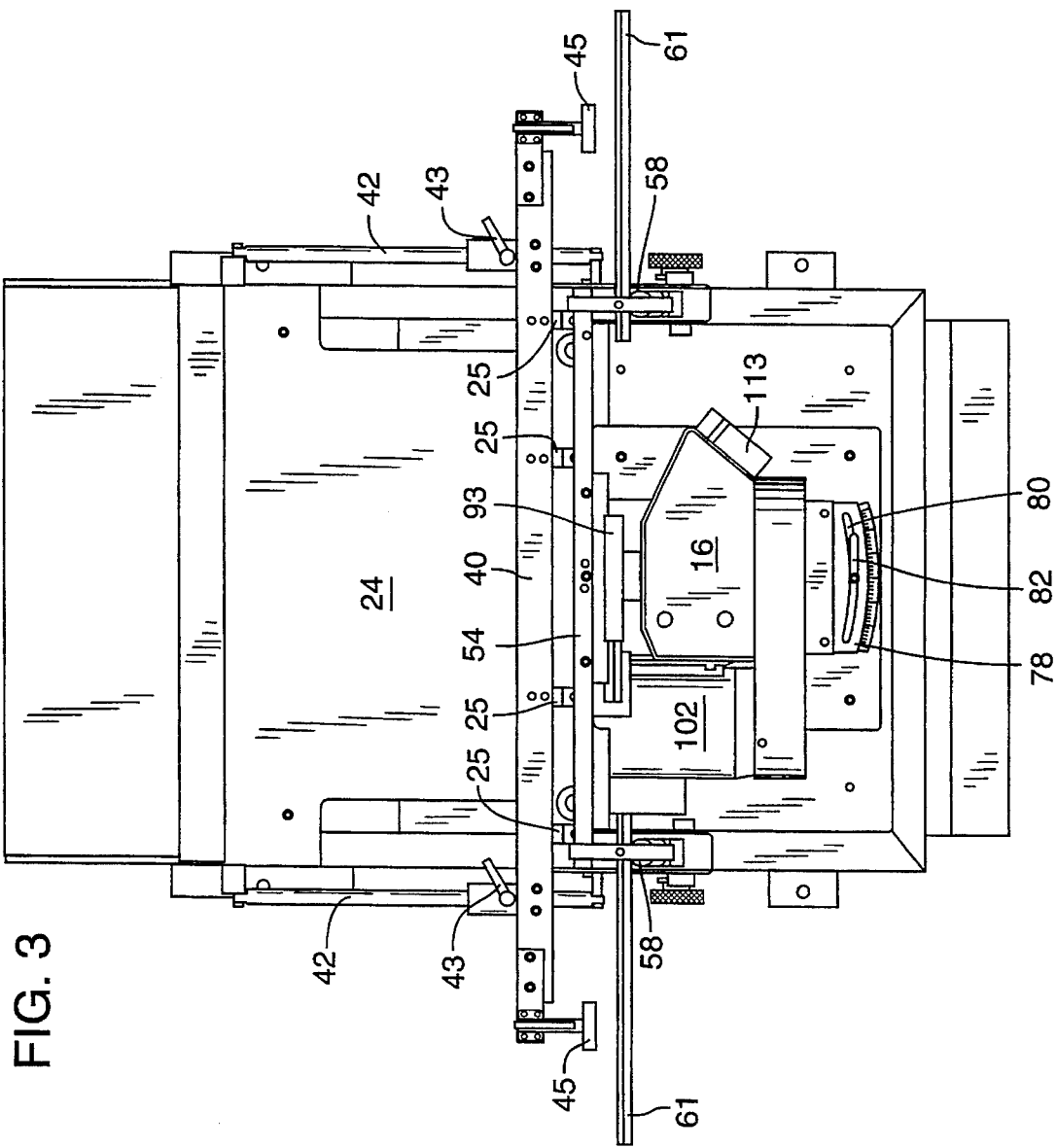
FIG. 3 is a top view of the grinding head assembly of the grinding apparatus.
Figure 4:
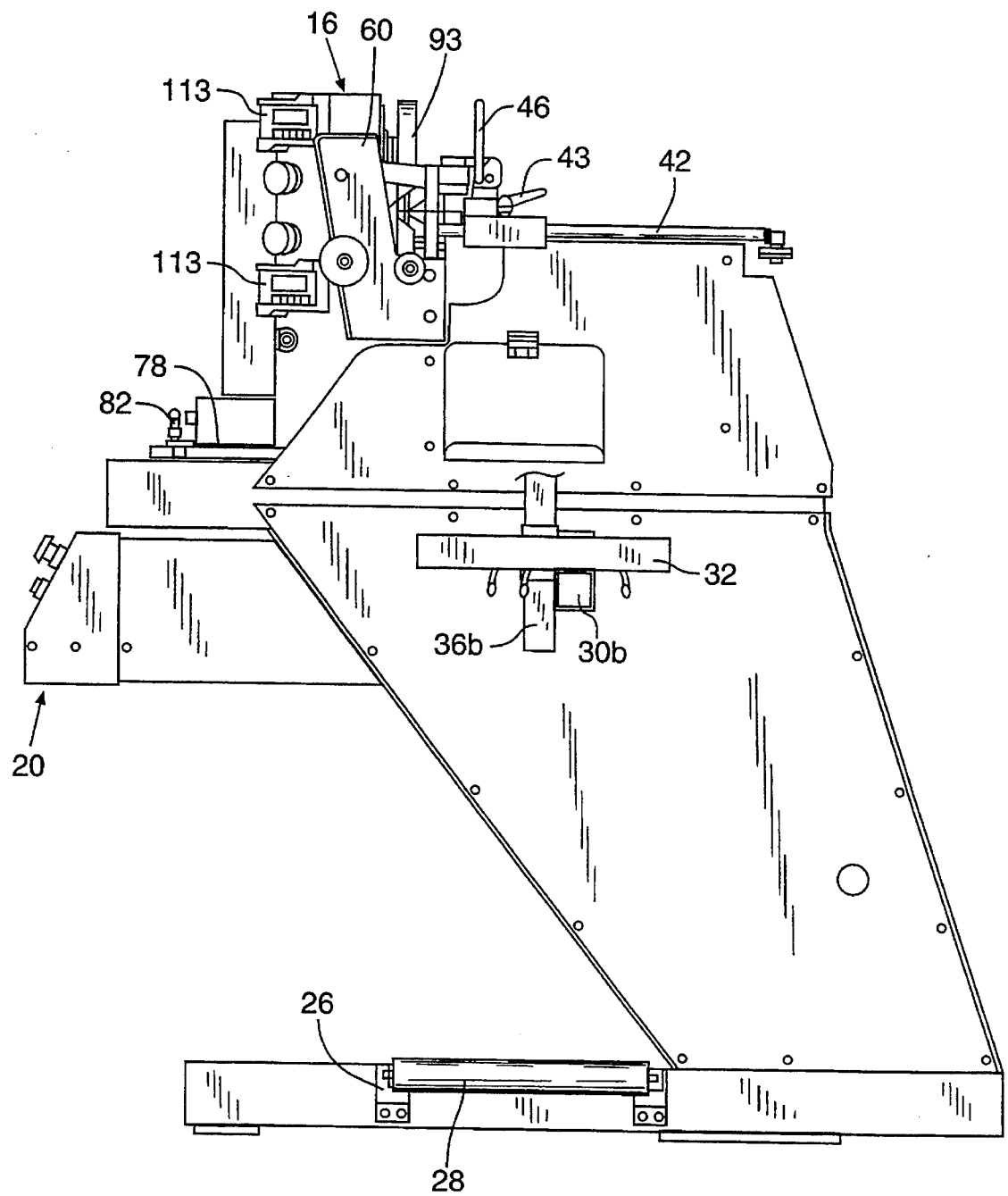
FIG. 4 is a right end elevation view of the grinding apparatus.
Figure 5:
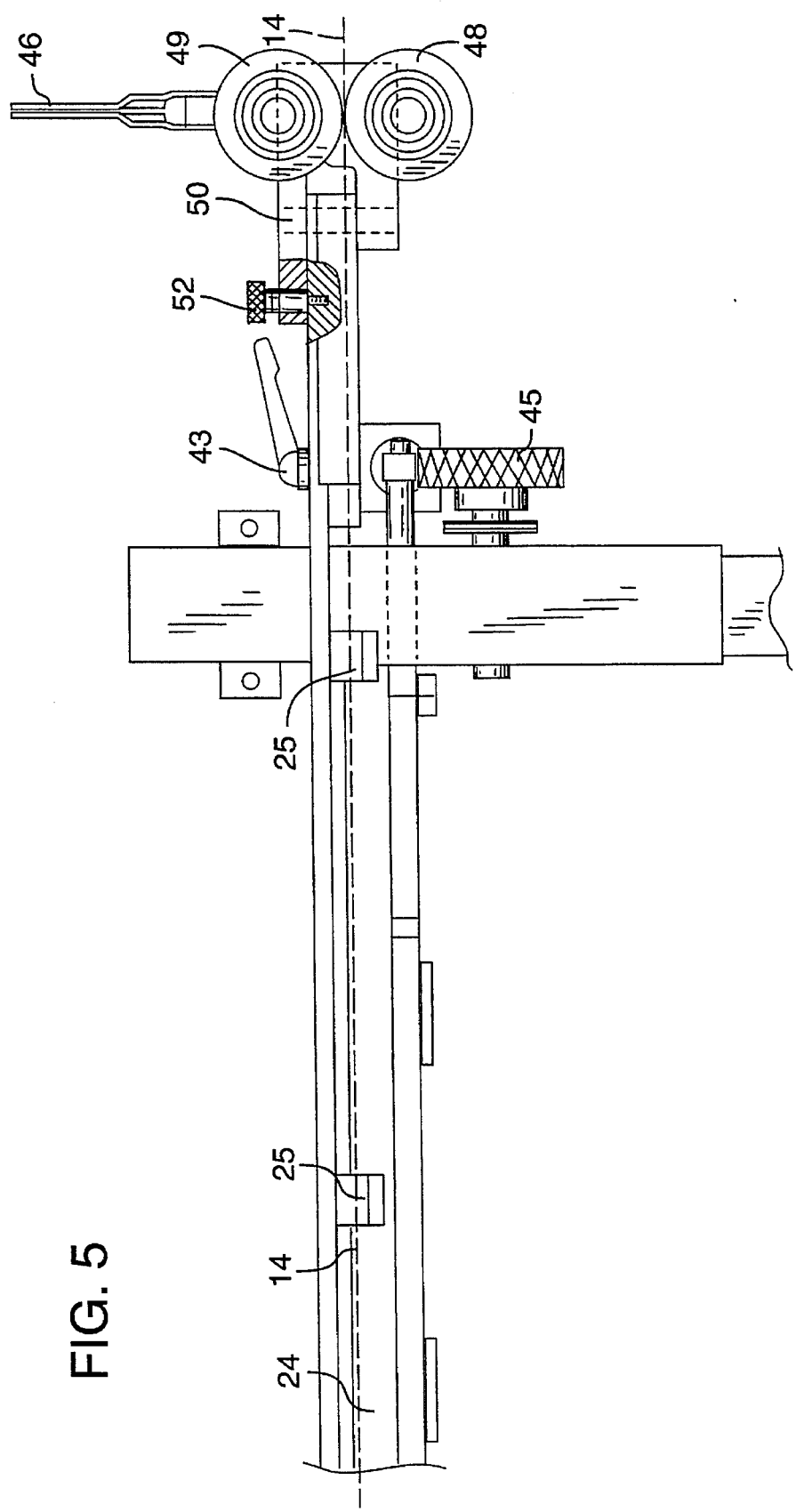
FIG. 5 is a front view of the saw table and roller clamp assembly.
Figure 6:
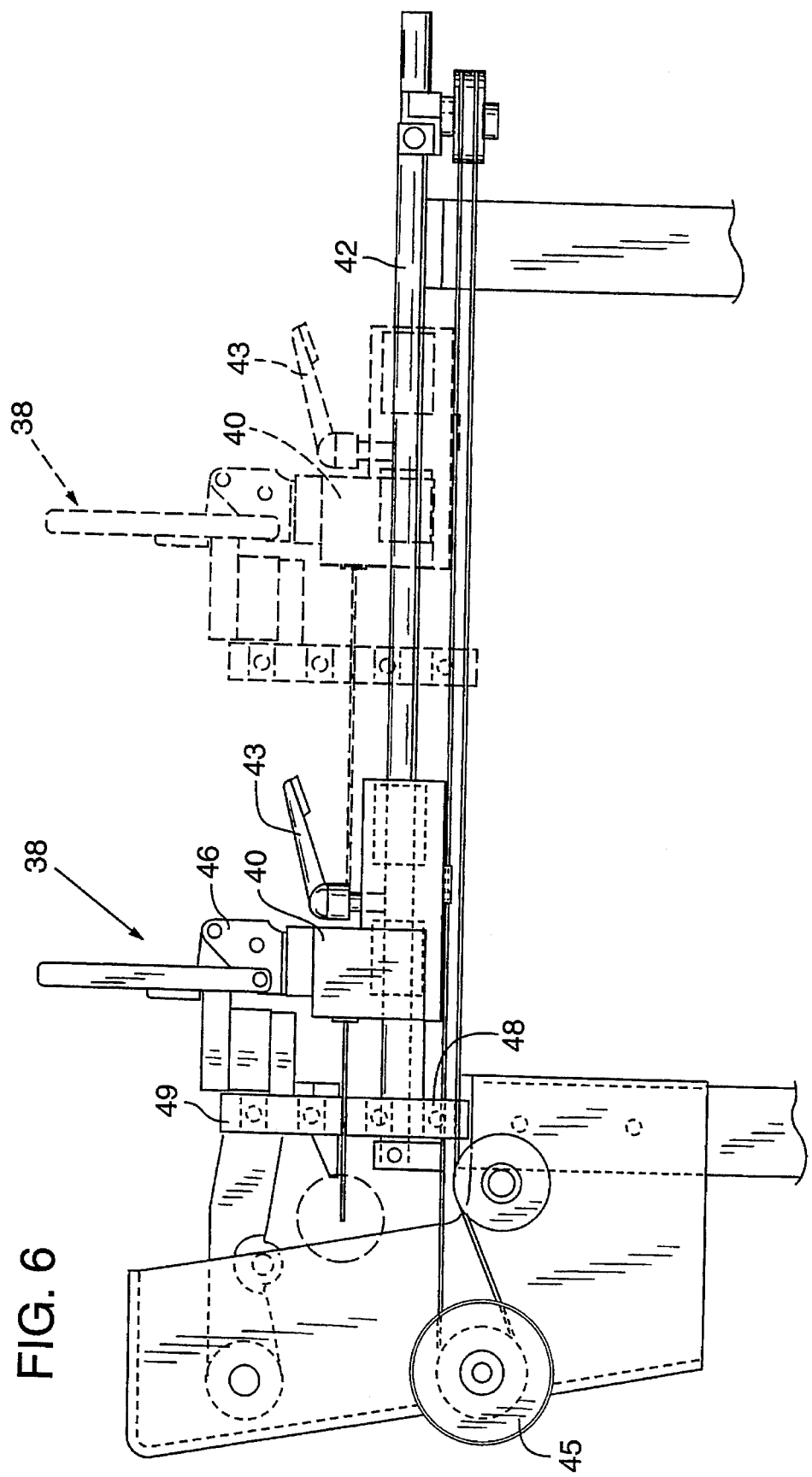
FIG. 6 is a side view of the saw table and fence assembly.

Referring now to FIGS. 2, 3 and 4 of the drawings, there is shown generally at 10 a grinding apparatus according to the invention. The apparatus includes a band saw blade mounting assembly 12 for mounting a band saw blade 14 in a desired spacial relationship to a grind head assembly 16; an indexing assembly 18 for sequentially advancing the saw blade past the grind head assembly under the control of a control system 20 to position successive teeth of the saw blade at a desired position with respect to the grind head assembly; and a clamp assembly 22 for maintaining the desired spacial relationship between the saw blade and the grinding head assembly.

Overview of Operation

Figure 1:
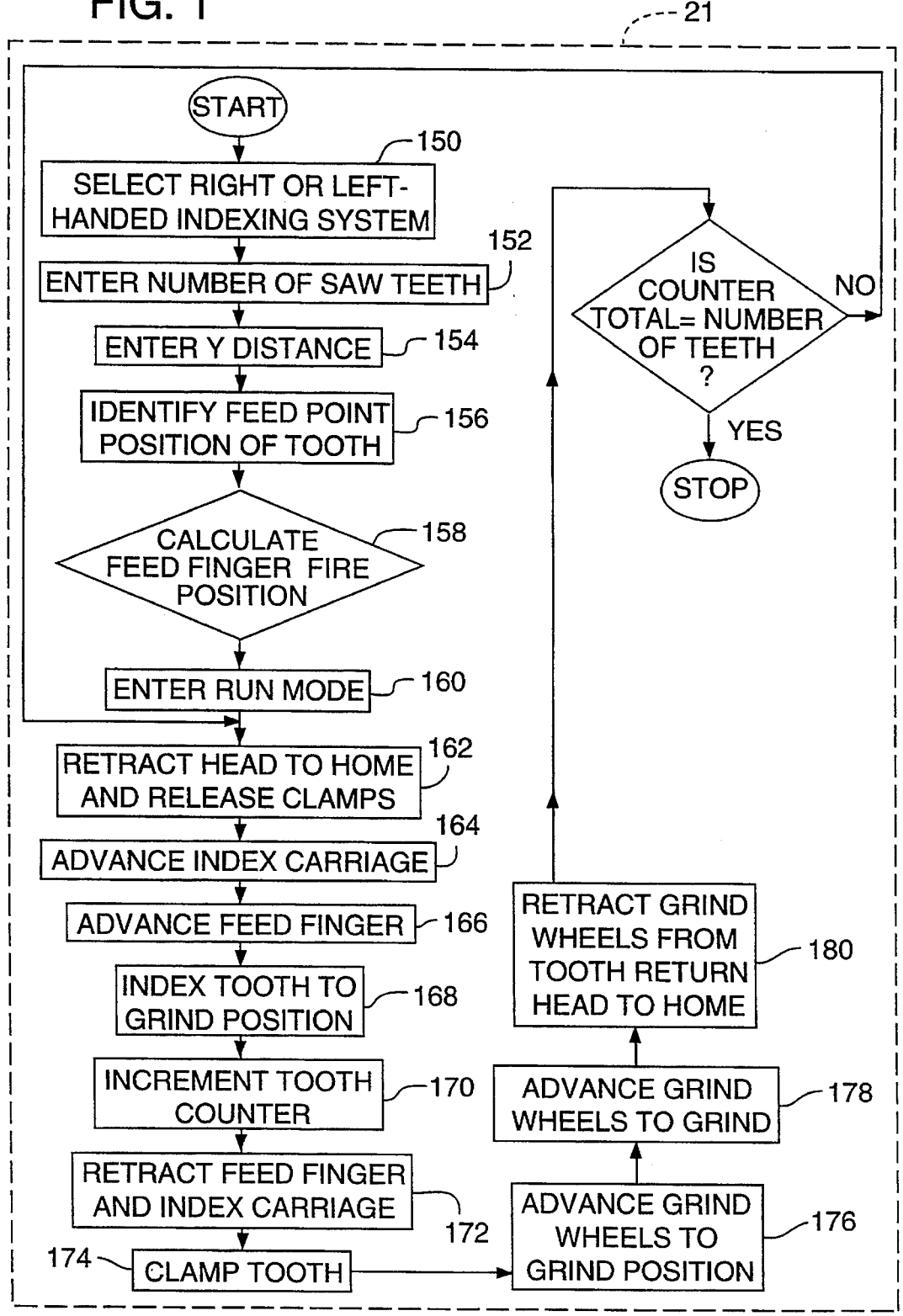
FIG. 1 is a flow chart illustrating operation of the grinding apparatus according to the invention.

FIG. 1 is a schematic flow chart illustrating the programmed operation of the apparatus 10 to side grind the teeth of a band saw, including the steps involved in side grinding a single saw tooth of the band saw. Each of the individual subassemblies described in detail below cooperate to facilitate the side grinding operation, which is generally controlled by a programmable controller 21 that is part of control system 20, and which is shown schematically in FIG. 1 by the dashed box enclosing the programmed operation. The programmed steps outlined in FIG. 1 will be referred to in parentheses in the following description.

Initially, a band saw is mounted on apparatus 10 such that the teeth of the blade extend horizontally (relative to the ground plane) at the position where the teeth are side ground, as shown in FIG. 2. With the saw blade mounted and positioned as described in detail below, the operator sets the controller to feed either a right-handed or a left-handed saw blade (150), depending upon the handedness of the blade that is to be ground. The number of saw teeth on the blade is then input into the controller (152), and the tooth spacing (Y) is determined and input (154). The saw blade is next adjusted such that a tooth is in a feed point position (156) for grinding. With this information the controller can calculate the position at which an indexing feed finger is activated to engage saw teeth to index the blade into the feed point position (158). The run mode is then selected (160), causing retraction of the grinding head to a home position and releasing the saw clamps (162).

The controller advances the indexing carriage (164) and as the carriage moves past a feed finger firing point (166) the controller activates the feed finger to engage a saw tooth, thereby indexing the saw tooth into the feed point position (168) and incrementally advancing the tooth counter (170). The controller then instructs the index carriage to retract the feed finger and return the carriage to the home position (172) and to clamp the saw blade (174). The grind wheels then move horizontally from their home position to the grind position (176), grinding both sides of the saw tooth (178) to predetermined clearance angles and dimensions. A limit switch signals the completion of the grind cycle and retracts the grind head to the home position (180). The controller compares the number of grinding cycles completed to the number of saw teeth input at (150). If the number of cycles (180) equals the number of teeth (150) the controller stops operation.

Saw Blade Mounting Assembly

Band saw blades form an endless loop. In the present invention, the band saw blade 14 is mounted on the apparatus 10 such that the loop of the saw blade is vertically oriented As used herein, "vertical" orientation of the band saw blade loop means that the width dimension of the saw blade 14 extends in a horizontal plane at the point where the grind head assembly grinds saw teeth and that the saw teeth that are being ground also extend horizontally, as shown in the Figures. It will be recognized that the vertical orientation of the saw blade relative to the grind head may be varied without departing from the invention. Thus, the position on the band saw at which the grind head side grinds teeth may be varied.

To mount a band saw blade on the grinding apparatus in this vertical orientation, the saw blade is positioned in front of the grinding apparatus 10 in a vertical loop with the saw teeth that are to be ground extending away from the grinding apparatus. The upper half of the band saw blade loop is lifted over the grinding head assembly 16 and then lowered so that the saw blade 14 is supported on a saw table 24 with the saw teeth 44 (FIG. 7) extending toward the grind head assembly 16. The lower portion of the band saw blade loop is then lifted onto a conveyer track 26, comprising a plurality of rollers 28, that is positioned near the floor. Telescopically extendable lateral support arms 30a and 30b, both of which have a guide roller 32 mounted to the distal end, are extended outwardly until the guide roller contacts the inner surface of the saw blade loop, and are locked in place with a locking mechanism 34. Vertically extendable support arms 36a and 36b, which are located on either side of the grind head assembly 16 and each of which also includes a guide roller 32 mounted to the distal end, are extended upwardly until the guide roller contacts the inner surface of the saw blade loop, and are locked in place with a locking mechanism. The lateral and vertical support arms, when in contact with the inner surface of the band saw blade, support the blade and hold the loop of the blade in a generally oval shape, as illustrated in FIG. 2.

The grinding apparatus of the present invention may be adjusted to accommodate both single cut and double cut band saws of different lengths. Thus, lateral support arms 30a and 30b are extendable inwardly and outwardly to support band saws of various lengths. With larger band saw blades the length of the oval loop is longer and additional modular conveyer tracks 26 may be added to support the lower side of the saw blade loop. In addition, lateral support arms 30a and 30b may include multiple telescoping sections to increase the lateral distance that the arms may be extended. Lateral support arms 30a and 30b also may be adjusted such that the oval loop of the band saw blade does not extend an equal distance on either side of the grinding head assembly. Thus, the loop of the saw blade may be biased to one side or the other of grind head assembly 16, depending upon space limitations in the grinding room at a particular saw mill.

With the band saw blade mounted in a vertical orientation very little mechanical force is needed to index or move the band saw blade past the grind head assembly. Thus, with the present invention no independent mechanical force other than the indexing system is required to advance the band saw blade past the grind head assembly for the grinding operation. Finally, the amount of floor space dedicated to the grinding apparatus is minimized because the vertical orientation of the band saw blade loop.

Saw Table Assembly

The saw table 24, which provides a horizontal platform across which the blade 14 is indexed as saw teeth are ground, includes a fence assembly 38 and clamp assembly 22, both of which help maintain saw blade 14 in a desired spacial relationship relative to the grinding head assembly as the saw teeth are ground. Saw table assembly 24 and its component parts is illustrated in FIGS. 5–8. Saw table 24 comprises a horizontal platform mounted to the support substructure adjacent to the grind head assembly. A plurality of pads 25 are attached to a fence 40 in position for the saw blade 14 to travel across as the blade is indexed. Pads 25 provide support for the lower side of saw blade 14 as it is indexed past the grinding head assembly, and are preferable made of a plastic or nylon material to minimize frictional resistance between the saw blade and the pads.

Figure 7:
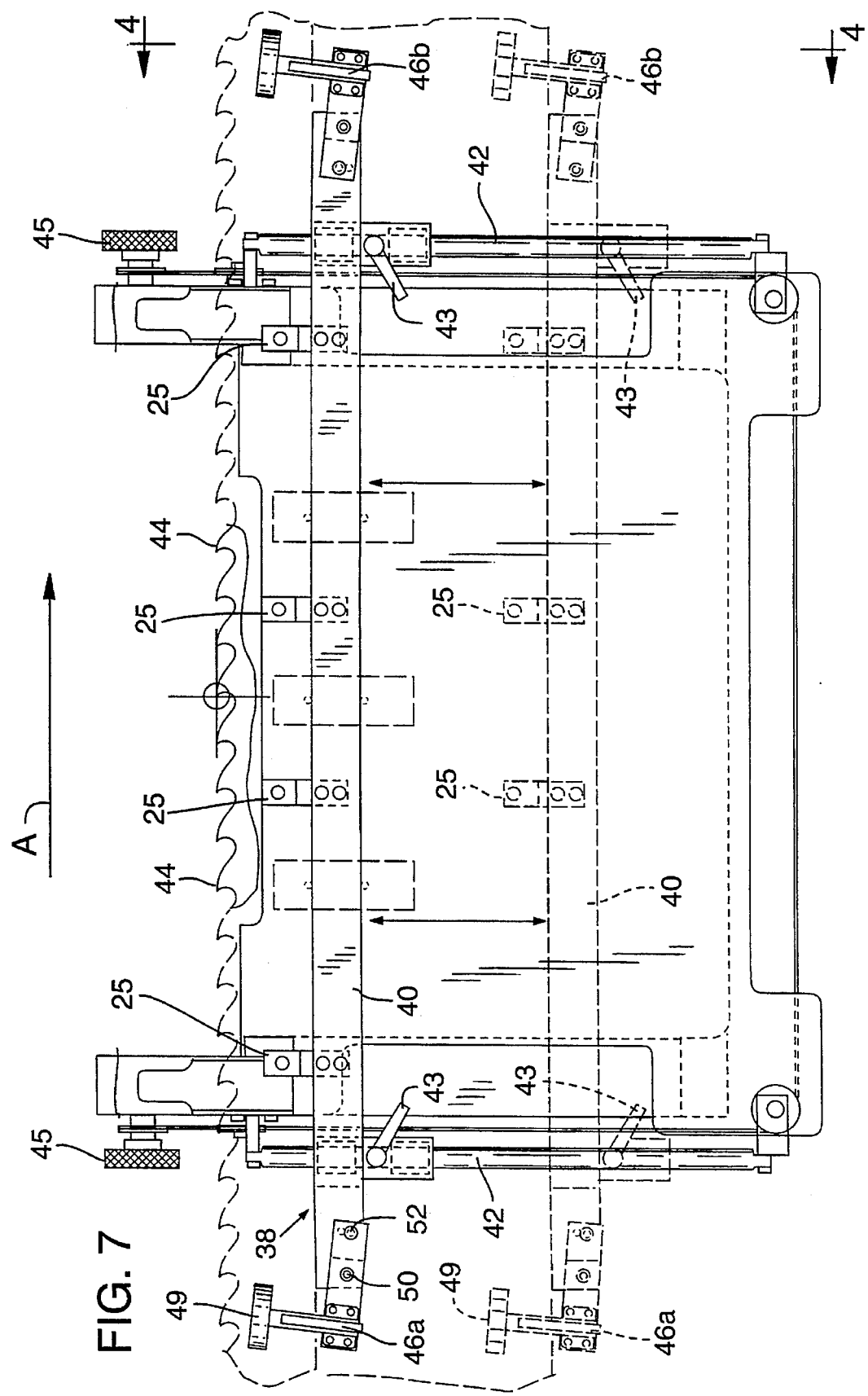
FIG. 7 is a top view of the saw table and fence assembly shown in FIG. 5.

Fence assembly 38 (FIGS. 6, 7) comprises a fence 40 mounted on a pair of opposed shafts 42 for movement toward and away from grinding head assembly 16, in the directions shown by the arrows in FIG. 7. Fence 40 is mounted for movement on shafts 42 in a conventional manner with a system of pulleys interconnected by a continuous wire such that as fence 40 is moved along shafts 42 toward or away from grind head assembly 16 the fence is maintained in a position that is parallel to any other position of fence 40 as it is moved along the shafts 42. Fence 40 is moved along shafts 42 by rotating one of two adjustment knobs 45 (FIGS. 5, 7), which in turn actuates the pulley and wire system; rotation of a knob 45 in one direction moves fence 40 toward grinding head assembly 16, and rotation of a knob 45 in the opposite direction moves fence 40 away from grinding head assembly 16.

A pair of adjustable roller clamps 46a and 46b are positioned near the outer opposite ends of fence 40. Roller clamps 46a and 46b each include a stationary lower wheel 48 upon which the inner or lower surface of saw blade 14 travels as the saw blade is indexed, and an adjustable upper wheel 49 that may be clamped against and unclamped from the outer or upper surface of saw blade 14.

A band saw blade 14 is mounted on the grinding apparatus 10 as described generally above. More specifically, because band saw blades come in many different widths (i.e., differing in their width dimension), fence assembly 38 is infinitely adjustable between its limit positions to adapt to most sizes of commonly used industrial band saw blades. Prior to mounting a saw blade, fence 40 is moved to its most rearward position, or the position furthest from grind head assembly 16, and the upper wheels 49 of roller clamps 46 are moved into their open position. With the saw blade 14 mounted on the grinding apparatus as described above with the saw teeth 44 extending toward grind head assembly 16, fence 40 is adjusted so that it butts against the back side of saw blade 14, opposite of saw teeth 44, as illustrated in FIG. 7. When blade 14 is a double cut blade, fence 40 is adjusted so that it butts against the saw teeth on the back side of the blade, opposite the teeth that are to be side ground. Because fence 40 is maintained in a parallel position at all times as it moves along shafts 42, the back side of the saw blade abuts fence 40 along the entire length of the fence, and saw blade is maintained at a desired spatial relationship to the grind head assembly.

Fence 40 is adjusted by rotation of either of the knobs 45 to move the saw blade toward the grinding head assembly until a saw tooth 44 is positioned at a position 47 that is referred to herein as the grind head pivot axis. This position is important to the indexing assembly and grinding of the saw teeth, as discussed in more detail below. When fence 40 is adjusted such that the saw tooth tip is located at the grind head pivot axis 47, fence assembly 38 is locked into position on shafts 42 with a pair of locking mechanisms 43, one for each shaft 42. Roller clamps 46a and 46b are then canted at an angle relative to fence 40 so that the clamps draw saw blade 14 toward and against fence 40 as the saw blade is indexed past grind head assembly 16. Thus, each roller clamp 46 may be canted at an angle in either direction relative to fence 40 to draw the saw blade toward the fence as the blade moves past the grinding head. As illustrated in FIG. 7, roller clamps 46 are canted such that saw blade 14, which is indexed in the direction of arrow A in FIG. 7, is drawn toward fence 40. If an opposite handed saw blade were being ground and therefore indexed in the opposite direction, roller clamps 46 would be canted in the opposite direction by pivoting the upper roller wheel 49 around pin 50 and locked into position with a pull pin 52. FIG. 7.

With roller clamps 46 correctly canted, upper wheels 49 are lowered onto the saw blade 14 and locked into position such that the upper roller wheels 49 bear against the upper surface of saw blade 14, thereby securely clamping blade 14 between upper wheels 49 and lower wheels 48.

Clamp Assembly

Figure 8:
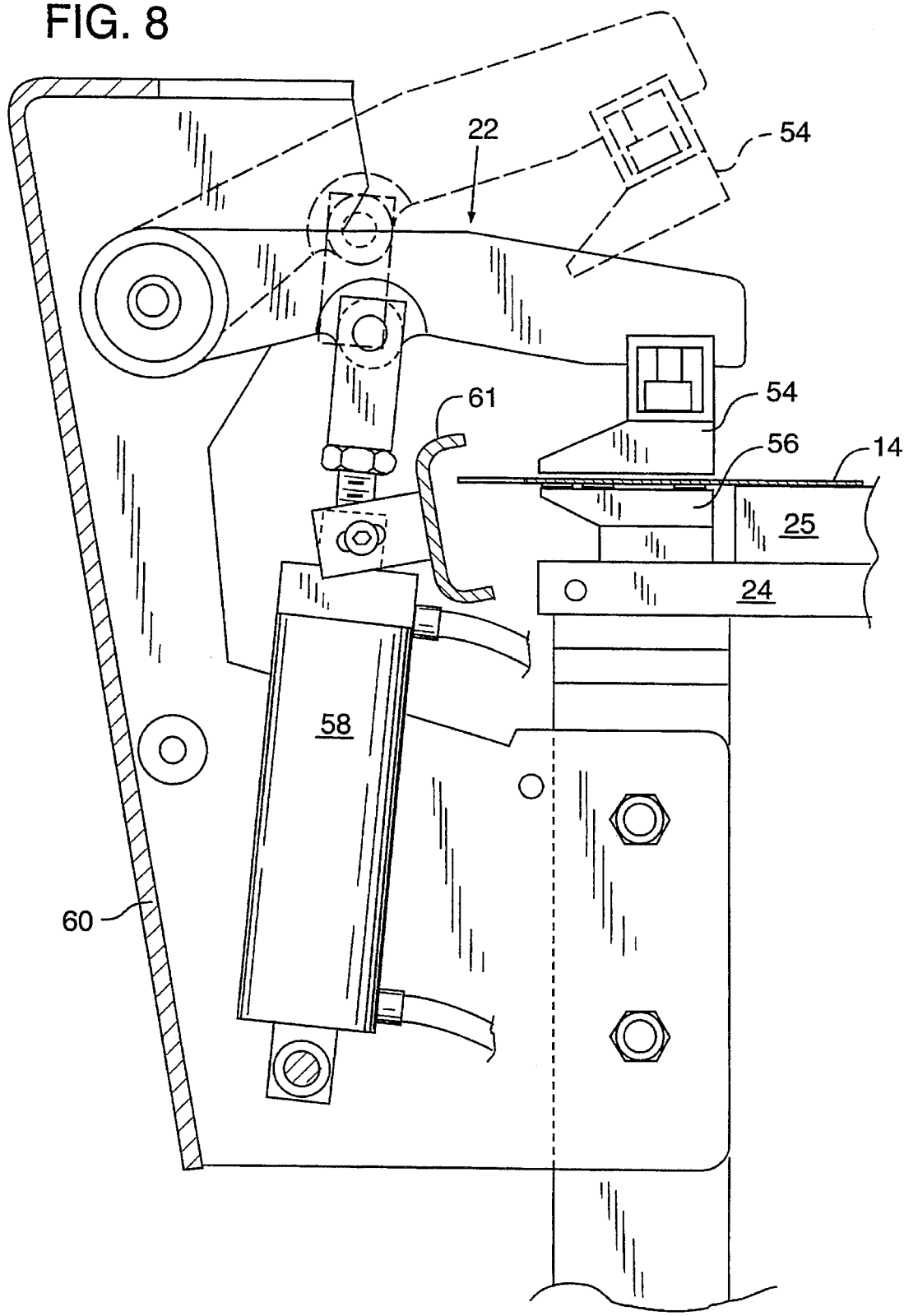
FIG. 8 is a side view of the saw table and clamp assembly.

A pneumatic clamp assembly 22 also helps maintain saw blade 14 in the proper grinding position on table 24 to fix and maintain the desired spacial relationship between the saw teeth 44 and grind head assembly 16, and is illustrated in FIG. 8. Clamp assembly 22 includes a movable upper clamping jaw 54 which extends across saw table 24, and a complementary fixed jaw 56 positioned below jaw 54 across table 24. Pads made of material identical or similar to pads 25 on fence 40 are attached to the clamping surfaces of jaws 54 and 56.

Upper jaw 54 is operated by a pair of double acting pneumatic cylinders 58 (one of which is illustrated in FIG. 8) disposed on either side of the grind head assembly 16 within housings 60. Upper jaw 54 is movable into an open position for mounting the saw blade 14 on apparatus 10, as illustrated by the dashed lines in FIG. 8. A protective guard 61 is mounted to the pneumatic cylinders 58 across the width of jaw 54 and 56 in a position to cover the saw teeth when jaw 54 is in the closed and clamped position to protect the operator from inadvertent contact with the saw teeth.

Indexing Assembly

The indexing assembly 18 of the present invention is shown in detail in FIGS. 9 and 10. In the preferred embodiment, indexing assembly 18 is redundant and thus capable of indexing right-handed saw blades in one direction past grind head assembly 16, and left-handed saw blades in the opposite direction past grind head assembly 16. The assembly includes a right-handed saw blade indexing mechanism 60, and a left-handed saw blade indexing mechanism 62. Each of the indexing mechanisms is separately operable and separately mounted on a carriage, 64 and 66 respectively, that are in turn mounted for reciprocal, independent linear movement along a pair of shafts 68.

The indexing mechanisms 60 and 62 are structurally identical but mirror images of each other. Referring to indexing mechanism 60, the carriage 64 is mounted in a position below saw blade 14 such that an indexing finger 70 carried in carriage 64 may be extended upwardly toward saw blade 14 to engage individual saw teeth 44 to effect indexing. A pneumatic cylinder 72 reciprocates to drive carriage 64 along shafts 68 in a linear, back and forth motion. In addition to movement of the carriages caused by the extension and retraction of cylinder 72, the linear position of a carriage on shafts 68 may be manually adjusted by rotation of a handle 67 connected to a threaded shaft 69 that is operably connected to a hard stop on pneumatic cylinder 72 such that clockwise rotation of handle 67 moves the associated carriage in one direction on shafts 68, and counterclockwise rotation of a handle 67 moves the associated carriage in the opposite direction. Thus, rotation of handle 67 alters the position of the hard stop of cylinder 72, and thereby alters the position at which extension of cylinder 72 ceases.

Indexing finger 70 is mounted in carriage 64 for pivotal movement about a pin 72. A pair of single acting pneumatic cylinders 74, 76 are mounted in carriage 64 below finger 70 and on either side of pin 72, such that activation of either cylinder 74 or 76 causes finger 70 to pivot about pin 72. Cylinder 74 is activated to extend finger 70 upwardly to engage a saw tooth 44, and cylinder 76 is activated to retract finger 70 by the pivoting movement around pin 72, thereby disengaging finger 70 from saw tooth 44 to effect a new indexing cycle. As detailed below, when an indexing finger is extended upwardly toward a saw blade 14, the indexing finger engages the saw tooth 44 and linear movement of carriage 64 pushes saw blade 14 by its engaged tooth to position the tip of the engaged tooth in an operative position at grind head assembly 16.

Each indexing mechanism 60 and 62 has an encoder (labelled 78 and 80, respectively) mounted to the supporting brackets for the indexing assembly. The encoders cooperate with a programmable controller in control system 20 to control the linear reciprocation of the carriages 64 and 66 on shafts 68 to index saw blade 14, and also to control the actuation of pneumatic cylinders 74 and 76 to control the extension and retraction of indexing finger 70. Encoders 78 and 80 are identical, and are standard encoders that generate an accurate number of electrical pulses per revolution of an internal shaft (not shown). The programmable controller is programmed to translate the number of pulses into a length of linear travel. Encoders 78 and 80 are interconnected by a cable 79, one end of which is fixed by a screw 81 to carriage 64, and the other end of which is fixed by a screw 83 to carriage 66. Cable 79 is wrapped several revolutions around a capstan pulley 85 that is keyed to the internal shaft of the encoder to ensure that cable 79 can not slip on the capstan pulleys as the pulleys revolve. Rotation of the capstan pulleys rotates the encoder shaft, thereby generating pulses that are transmitted to the programmable controller. A spring 87 is positioned in-line in cable 79 between encoders 78 and 80.

As detailed completely below, as one of the carriages is moved in a linear direction along shafts 68, cable 79 is pulled by the carriage, causing the capstan pulley 85 to rotate, and thereby rotating the encoder shaft and generating pulses.

Each indexing mechanism 62 and 64 has a "home position" and a "feed point position." The home position is defined as the position where the pneumatic cylinder that drives the carriage along shafts 68 is fully retracted such that the carriage is positioned to initiate another indexing cycle. The feed point position is defined as the position where carriage movement along shafts 68 stops at the completion of one indexing cycle, and is therefore the position where the saw blade stops moving across table 24 as it is indexed.

Grind Head Assembly

The grind head assembly 16 is detailed in FIGS. 11–15. The entire head assembly 16 is pivotally mounted on a base plate 78 for pivotal movement about the grind head pivot axis 47. An arcuate slot 80 is formed in base plate 78 opposite pivot axis 47, and a threaded locking lever 82 extends through slot 80 to allow base plate 78 to be locked into an any position between the ends of slot 80 as the grind head assembly 16 pivots about axis 47.

Figure 11:
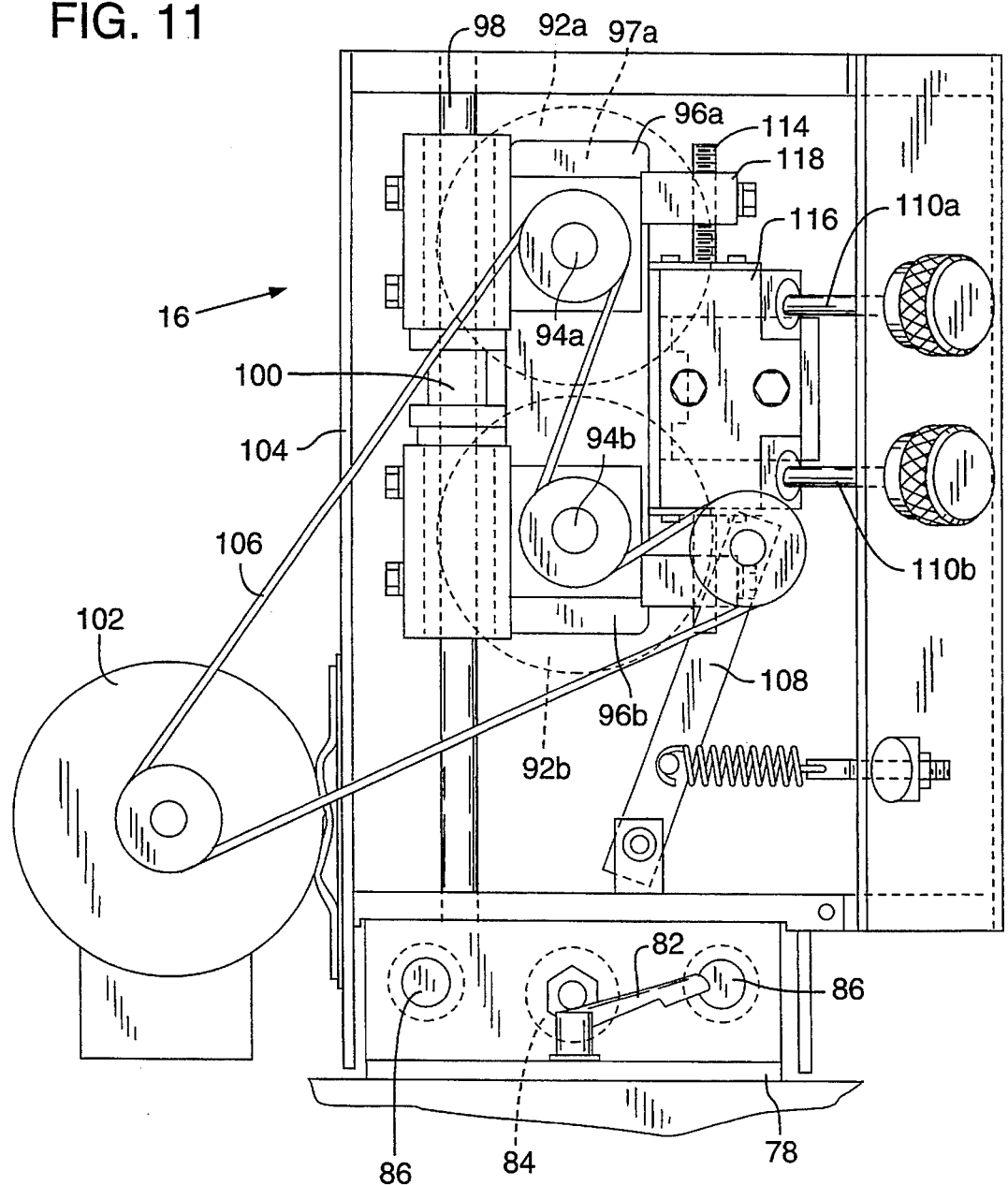
FIG. 11 is a front elevation view of the grinding head assembly.
Figure 12:
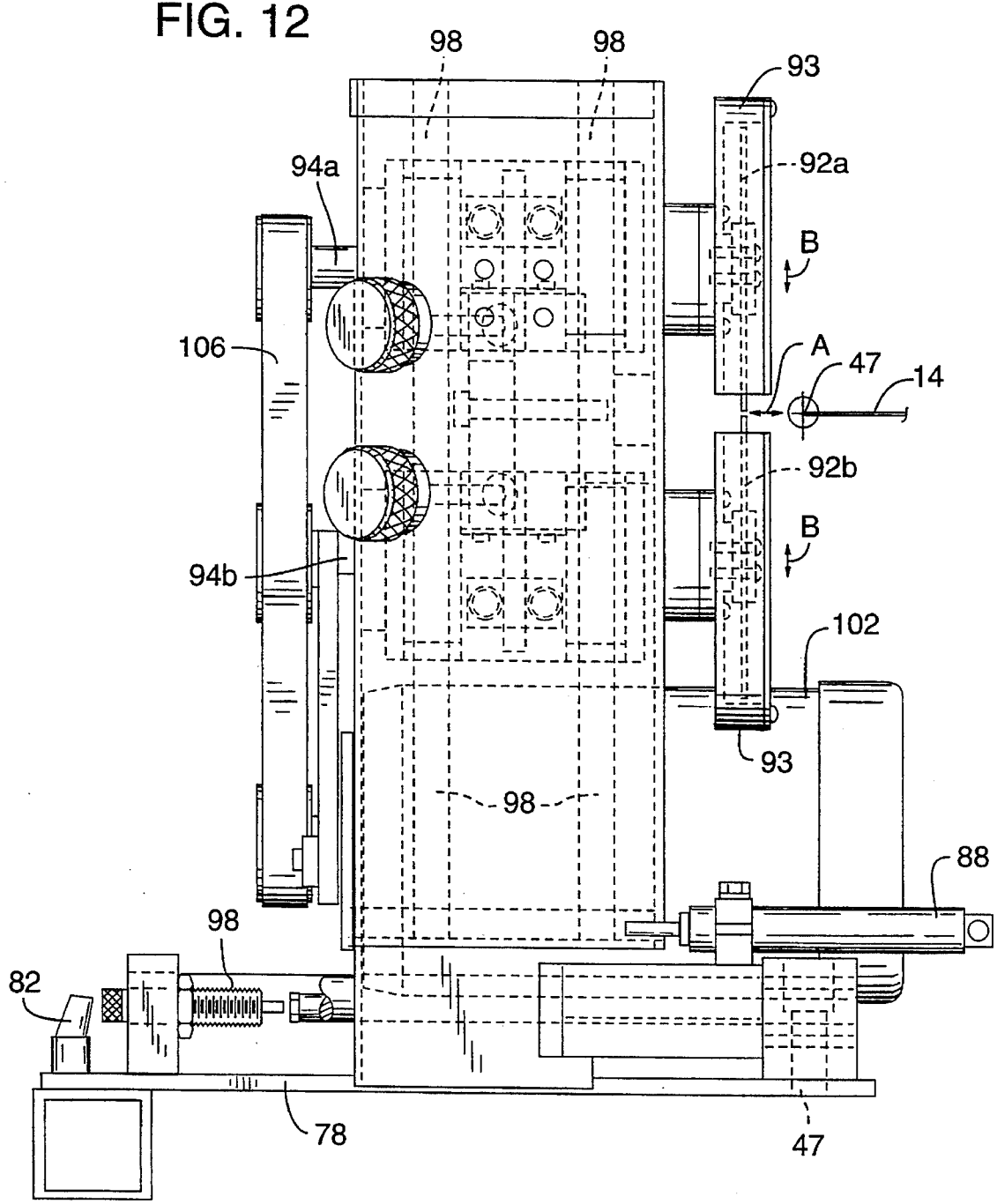
FIG. 12 is a right side partially cut-away view of the grinding head assembly shown in FIG. 11.
Figure 13:
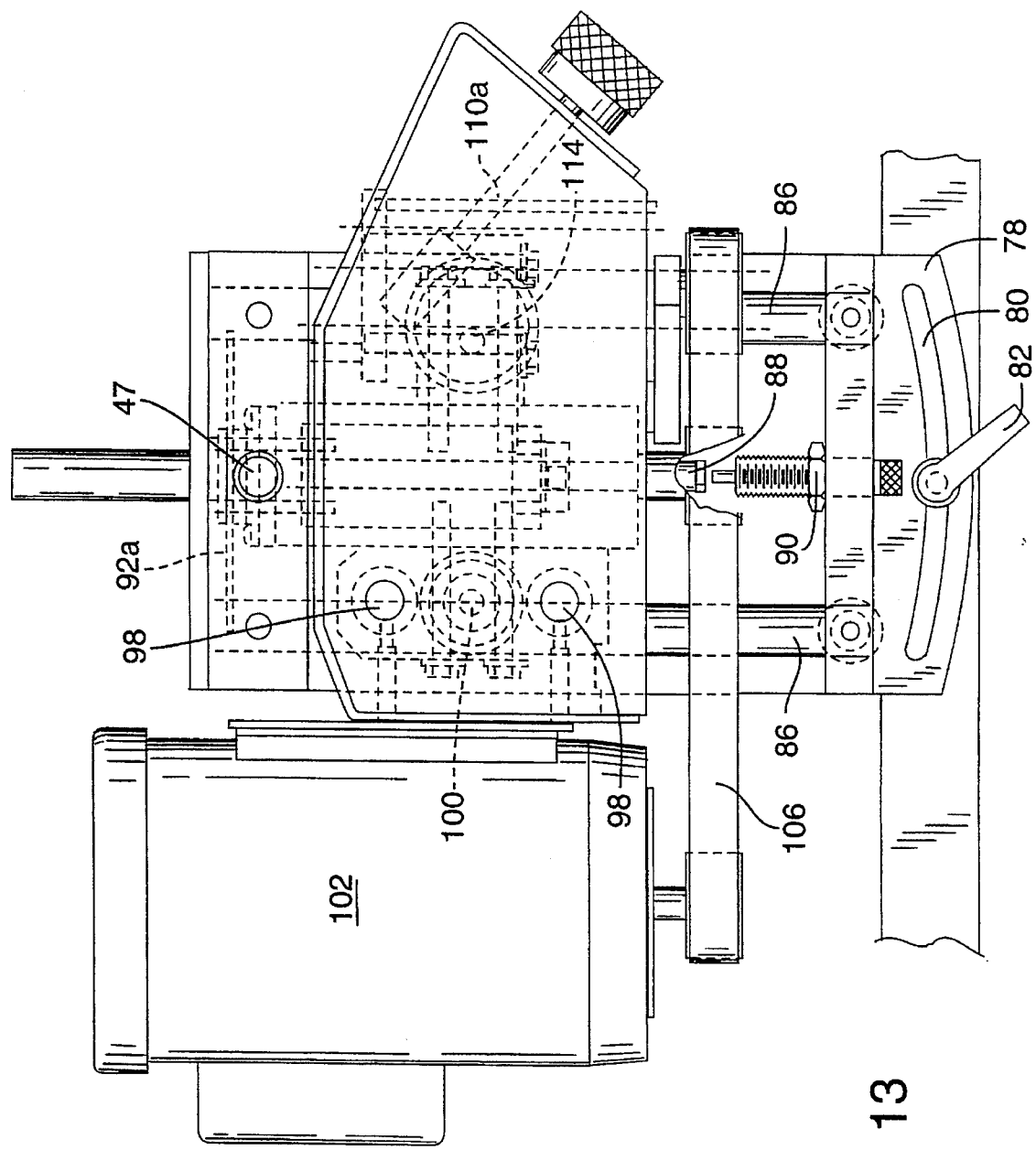
FIG. 13 is a top view of the grinding head assembly shown in FIG. 11.

Grind head assembly 16 is also mounted for movement toward and away from a sawtooth 44 as it is clamped in an operative position on saw table 24, in the direction indicated by arrow A on FIG. 12. This transverse movement of grind head assembly 16 from a "home position," defined as the position where the activating pneumatic cylinder is fully extended, toward the sawtooth 44 and into a "grinding position," defined as the position where the grinding wheels contact the sawtooth to affect grinding, and retraction in the opposite direction to return from the grinding position to the home position, is accomplished with a pneumatic cylinder 84 that drives the entire head assembly 16 along a pair of rods 86. FIG. 11. A shock absorber 88, which may be for example mechanical or hydraulic, engages a flange on grind head assembly 16 just prior to the point where the grinding elements contact the sawtooth at the grinding position to slow the travel of head assembly 16 as it moves toward a sawtooth 44 and the grinding position. Shock absorber 88 ensures that the grinding wheels move over the sawtooth at an appropriate rate. A second shock absorber 90 mounted to the rearward end of the grind head assembly opposite pivot axis 47 slows travel of the grind head assembly as it is retracted from the grinding position to the home position. This prevents banging of the grind head assembly against its support structures as the assembly reciprocates during the grinding operation.

As best illustrated in FIG. 11, a pair of opposed grinding elements such as grinding wheels 92a and 92b are mounted by conventional means on the ends of arbor shafts 94a and 94b, respectively, which in turn are mounted in arbor mounting blocks 96a and 96b. A removable protective guard 93 covers each grinding wheel 92 such that the working part of the wheels is exposed, but the remaining portions of the wheels is covered to prevent operator injury. Arbor mounting blocks 96a and 96b are in turn mounted for reciprocal vertical movement on a pair of rods 98, transverse to the direction of reciprocation of grind head assembly 16 as it moves from the home position to the grinding position, horizontally toward and away from saw blade 14. A double acting pneumatic cylinder 100 mounted between rods 98 drives the arbor mounting blocks 96a and 96b vertically in the directions indicated by the arrows B in FIG. 12, thereby alternately separating and drawing together the grinding wheels, as explained below.

A grind wheel drive motor 102, which may be electrical, hydraulic or other, is mounted on the side of a grind head assembly housing 104. A drive belt 106 interconnects pulleys keyed to the ends of arbor shafts 94a and 94b such that the grinding elements 92a and 92b rotate in opposite directions as drive motor 102 rotates. A spring-tensioned idler arm 108 maintains tension on drive belt 106 regardless of the position of arbor mounting blocks 96a, 96b on rods 98.

Figure 14:
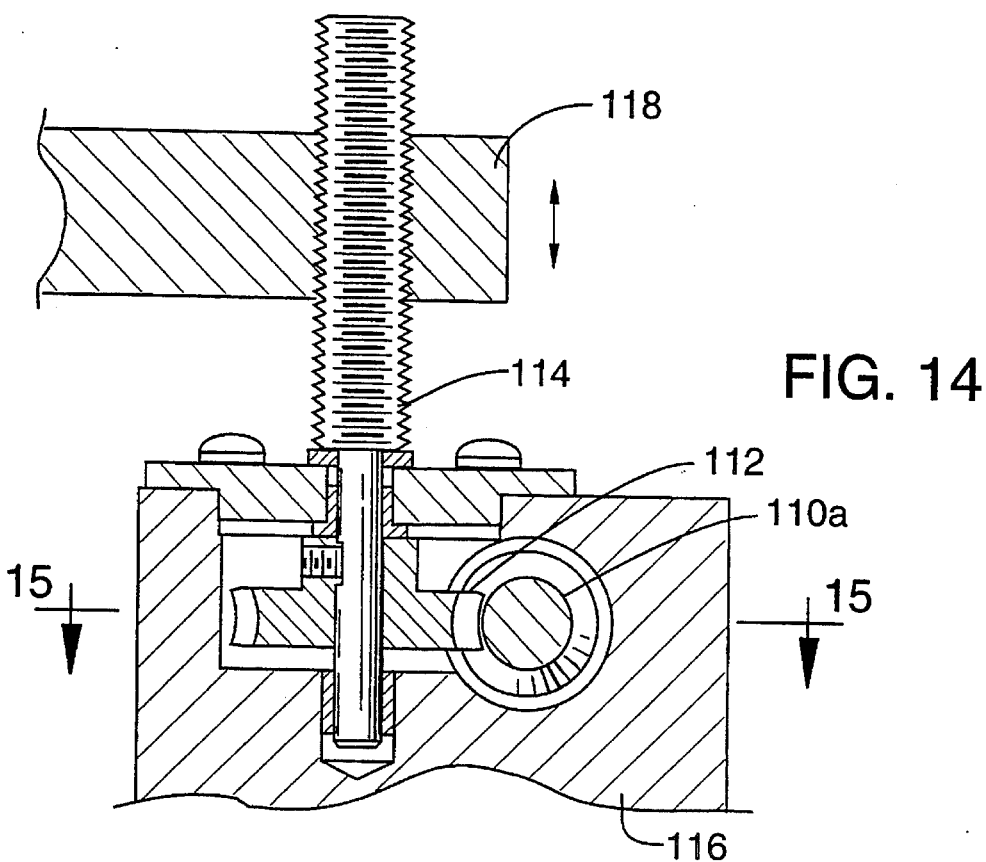
FIG. 14 is a sectional view of the arbor positioning mechanism of the grinding head assembly.
Figure 15:
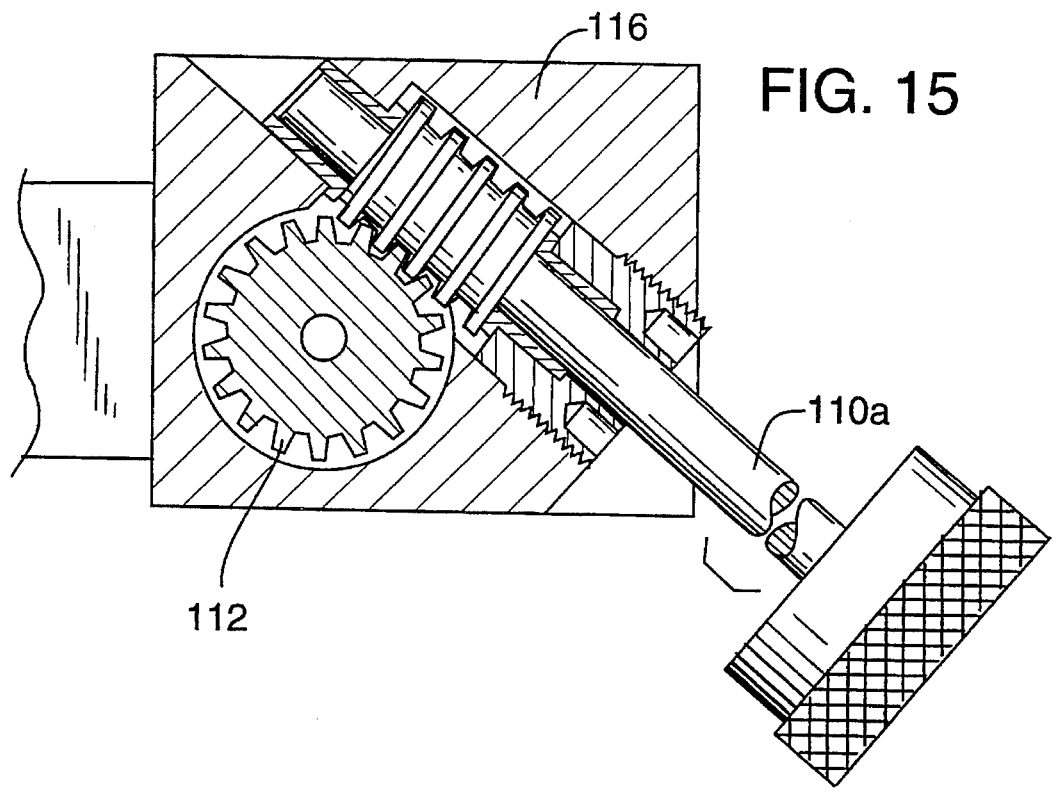
FIG. 15 is a sectional view of the arbor positioning mechanism taken along the line 15—15 of FIG. 14.

As best illustrated in FIG. 12, grind wheel 92a is positioned to grind the radial and tangential clearance angles of the "upper" side of a sawtooth as the band is supported on saw table 24. Grind wheel 92b is correspondingly positioned to grind the radial and tangential clearance angles of the "lower" side of the same sawtooth at the same time. The vertical position of grind wheels 92a and 92b relative to the sawtooth may be adjusted by rotation of an adjustment rod (110a and 110b, FIG. 11), which is threaded on one end with a worm gear 112 that interconnects with a complementary threaded shaft 114 in a gear housing 116. FIGS. 14 and 15. Referring to the vertical adjustment of grind wheel 92a, threaded shaft 114 extends through an aperture formed in housing 116 and interconnects with a threaded arm 118 that extends from arbor mounting block 96a. Rotation of rod 110a causes rotation of threaded shaft 114, which in turn causes arbor mounting block 96a to move along shafts 98 in a vertical direction, up or down depending upon the clockwise or counterclockwise direction of rotation of rod 110a.

There is some play or "backlash" in the threads of threaded shaft 114. This play allows pneumatic cylinder 100 to move the grinding wheels 92 in the directions of arrow B in FIG. 12. Thus, when pneumatic cylinder 100, which as noted is a double acting cylinder, is actuated arbor mounting block 96a is urged upwardly to the extent allowed by the amount of backlash in the threads of threaded shaft 114, and arbor mounting block 96b is urged downwardly to the same extent. Retraction of cylinder 100 causes movement of the arbor mounting blocks in the opposite directions.

Digital micrometers 113 (FIGS. 2–4) are provided to measure and zero the position of each grind wheel 92a and 92b relative to a sawtooth that is to be ground.

Set Up and Operation

With fence 40 moved to the rearward end of saw table 24 opposite grind head assembly 16, upper jaw 54 moved into its completely open position as shown in FIG. 8, and with the grind head assembly 16 and the indexing mechanisms in their home positions, a saw blade 14 is mounted on grinding apparatus 10 as described above. The operator adjusts fence 40 so it butts against the rearward side of saw blade 14, and continues adjusting fence 40 until the tip of a saw tooth is in the desired position relative to grind head pivot axis 47. The operator then closes upper jaw 54 into the clamped position on saw blade 14.

Figure 16:
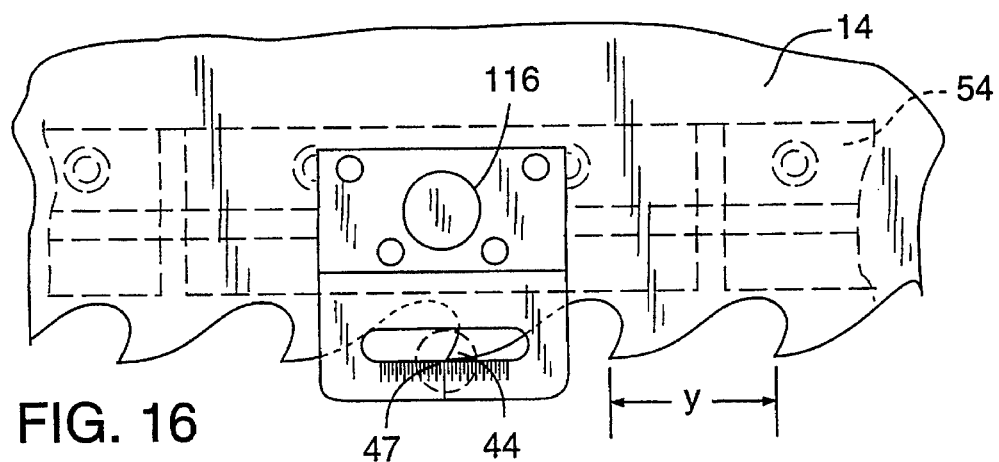
FIG. 16 is a top schematic view of the saw blade alignment gauge mounted in position on the grinding apparatus.
Figure 17:
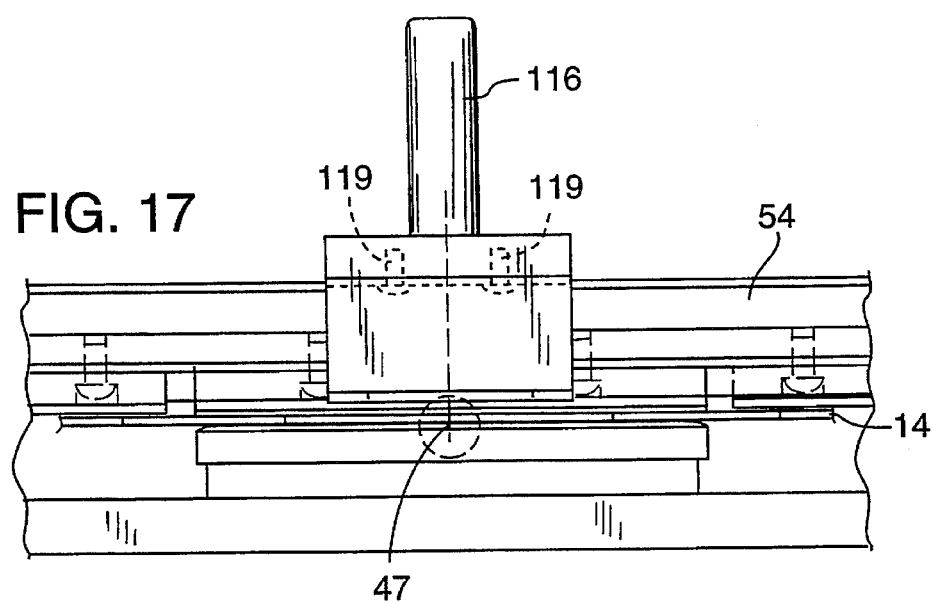
FIG. 17 is a front view of the alignment gauge shown in FIG. 16 mounted on the saw clamp.
Figure 18:
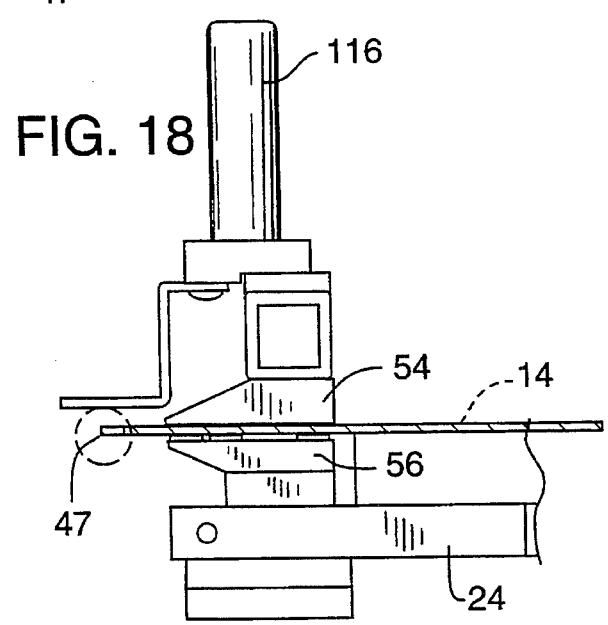
FIG. 18 is a side view of the saw table showing the alignment gauge shown in FIG. 16.

As illustrated in FIGS. 16–18, an alignment gauge 116 that includes a slot having graduations along one edge is then mounted above saw blade 14 on pins 119 on upper jaw 54. Gauge 116 assists the operator in aligning the tip of sawtooth 44 at a desired position over the pivot axis 47. Although it is not shown, alignment gauge 116 includes an electromagnetic switch that signals the programmable controller when the gauge is in place on upper jaw 54. With the gauge so positioned, the controller will not allow the grind head assembly 16 to be moved from the home position to the grind position.

Figure 21:
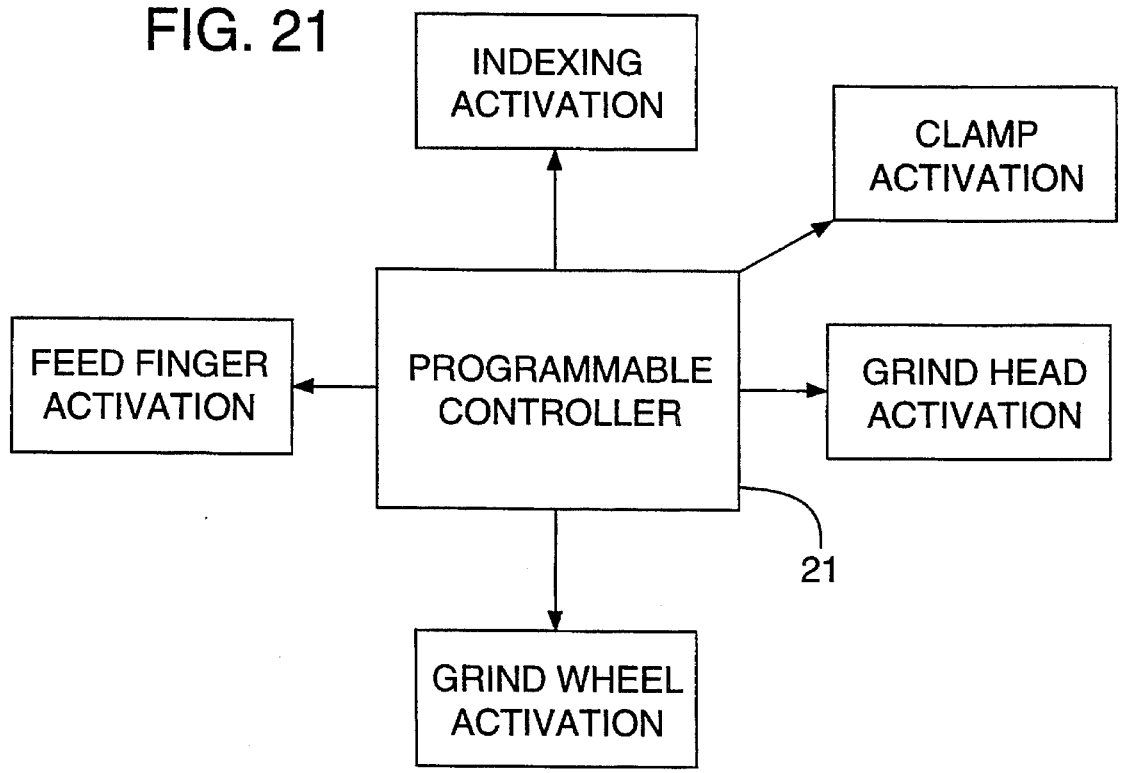
FIG. 21 is a schematic block diagram illustrating the individual programmed operations under the control of a programmable controller.

The operator inputs into control system 20 the number of sawteeth 44 on saw blade 14. The control system, which includes a programmable controller 21 (FIG. 21) such as an Allen-Bradley SLC500, controls operation of the entire programmed operation as illustrated in FIG. 1. Controller 21 thus controls activation and operation of the indexing assembly including the extension and retraction of the feed fingers, activation and operation of the saw clamp assembly, and activation and operation of the grind head assembly including grind wheels.

The operator inputs the tooth spacing into control system 20. Tooth spacing is commonly defined as the distance from the tip of a sawtooth to the tip of the next adjacent sawtooth, and is illustrated as distance Y in FIG. 16. Tooth spacing is determined and entered into the control system 20 in the same units as the graduations on adjustment gauge 116, and also the same units that encoders 78 and 80 are calibrated in, although it is not necessary that the calibration units on gauge 116 be the same. Thus, for example, if the apparatus is set up to be calibrated in 1/16 inch graduations, the operator would enter into the tooth spacing control the tooth spacing Y in sixteenths of an inch. The apparatus could also be calibrated in metric units.

The operator then manually selects on the control system 20 the indexing mechanism 60 or 62 that corresponds to the handedness of the saw blade that is mounted on the apparatus. Thus, for example, if the tips of sawteeth on a right-handed saw blade are to be ground, the operator selects indexing mechanism 60. Indexing mechanism 62 would be selected for a left-handed saw blade. With carriage 64 moving out of the home position toward the feed point position, the indexing finger 70 on indexing mechanism 60 activated by the programmable controller 21 based upon the tooth spacing input by the operator, activating pneumatic cylinder 74 and thereby extending indexing finger 70 upwardly to engage a sawtooth 44. The operator then manually adjusts the longitudinal position of saw blade 14 with respect to pivot axis 47 by rotation of handle 67. The actual position of sawtooth 44 relative to pivot axis 47 is set according to operator preference. Thus, the operator may select to move sawtooth 44 in either direction relative to axis position 47 in conjunction with the angle at which grind head 16 is adjusted to change the radial and tangential clearance angles. The calibrations on alignment gauge 116 provide the operator with an indication of the number of graduations that the tip of the saw tooth is moved on either side of the axis position. This is the feed point position.

Figure 19:
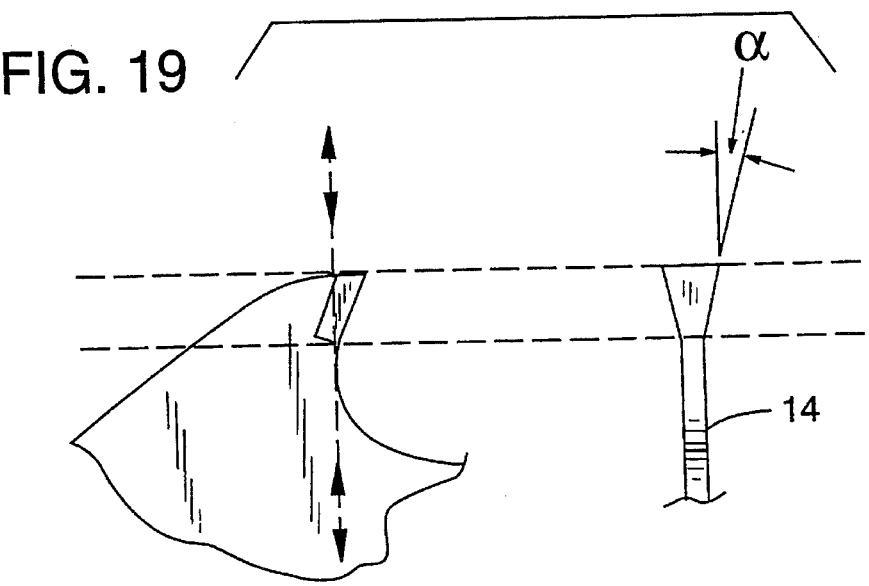
FIG. 19 is a schematic diagram illustrating the geometry involved in side grinding the radial clearance angle of the tip of a saw tooth, showing a frontal view of the tooth.

FIG. 19 is a schematic view illustrating how the two grind wheels of the present invention grind the radial clearance angle ($\alpha$) of a saw tooth tip, which as viewed from the front of the tooth 44 is the angle that the saw tooth tapers in the direction from the upper side of the tip toward the saw blade 14. In FIG. 19 the grind head assembly is set at the zero degree setting such that it travels from the home position to the grind position perpendicular to the longitudinal axis of the saw blade, as shown by the arrows in FIG. 19. The clearance angle varies as the grind head assembly is pivoted about pivot axis 47 out of the zero degree setting shown in FIG. 19.

Figure 20:
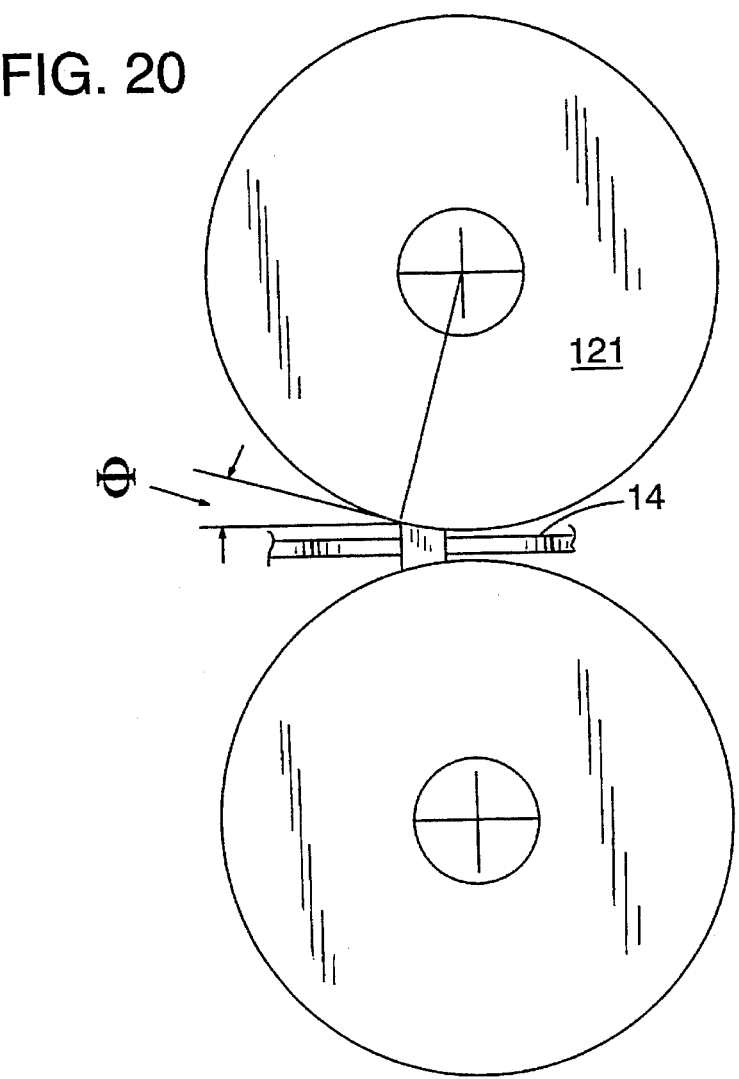
FIG. 20 is a schematic diagram illustrating the geometry involved in side grinding the tangential clearance angle of the tip of a saw tooth, showing a top view of the tooth.

FIG. 20 is a schematic view illustrating the geometry involved in grinding the tangential clearance angles ($\theta$) of a saw tooth 44. In FIG. 20 grind wheels 120, 121 are shown in the grinding position. As the position of the grind wheels relative to the saw tooth varies, the tangential clearance angle varies.

Both the tangential and radial clearance angles are set by the operator according to preference, and may be varied by appropriate adjustment of the apparatus in any of three separate manners with the present invention. First, the grind position of the wheels, which as noted is the position at which the grind wheels contact the tip of the sawtooth, lies in the same vertical axis as the vertical axis through pivot axis 47. Because grind head assembly 16 pivots around pivot axis 47, as the grind head is pivoted around axis 47 the angle at which the grind wheels approach the grind position and the sawtooth is altered, thereby altering the tangential clearance angle and radial clearance angle. Second, movement of the tip of a sawtooth 44 in the longitudinal direction on either side of pivot axis 47 alters the grind angles because the position on the radial curvature of the grinding wheels where grinding wheels contact the sawtooth will change. Finally, the diameter of the grind wheels and the vertical distance the grind wheels grind into tip 44 affects the tangential clearance angles.

At this point with the position at which grinding head assembly 16 is pivoted about pivot axis 47, and also the feed point position selected according to operator preference, the grind head assembly is locked into place.

The grinding wheels are then adjusted in a vertical direction by rotation of adjustment rods 110a, 110b, again according to operator preference, so that the desired amount of material is ground from sawtooth 44. Typically, the operator will at this point remove gauge 116 and turn on drive motor 102 and activate a jog feature of control system 20 that will cause the grind head assembly 16 to move from its home position on shafts 86 to the grind position to complete one grind cycle. The controller automatically activates the clamp assembly prior to movement of the grind head assembly from the home position to the grind position. This verifies correct positioning of the grind wheels, the grind head assembly, and the feed point position. Adjustments are made as needed. With the grind wheels set to the desired position, micrometers 113 are zeroed.

The indexing system may then be manually jogged to ensure proper adjustment of the feed point position. When the operator set the position of the tip of the sawtooth 44 relative to pivot axis 47, the encoder and the controller designate this point to be the feed point position. With the pneumatic cylinder that drives the carriages along shafts 68 in the fully retracted position, the encoder and the controller then set the home position for the carriage 64. With the carriage in the home position, the controller calculates the difference between the number of pulses from the encoder encountered as the carriage moves from the home position to the feed point position, and the number of pulses that corresponds to the linear tooth spacing distance, which has been input by the operator, to determine at which point the feed finger 70 should be extended upwardly to engage the next adjacent sawtooth. To verify this adjustment the operator may jog the indexing system. The indexing system may be activated only with the grind head assembly in the home position. Activation of the indexing jog control causes the clamp assembly to release the clamping pressure on saw blade 14 to facilitate longitudinal movement of saw blade 14. Pneumatic cylinder 72 is activated to initiate the linear movement of carriage 64 along shafts 68 from the home position toward the feed point position. As carriage 64 moves, capstan pulley 85 rotates and encoder 78 begins transmitting pulses to the controller. When the proper number of pulses from the encoder is detected by the controller, the controller activates pneumatic cylinder 74, extending feed finger 70 in an upward direction to engage the next adjacent sawtooth. Cylinder 72 continues to move carriage 64 along shaft 68, thereby indexing saw blade 14 toward the feed point position, which is the position when cylinder 72 reaches its hard stop, which has been manually set by the operator. A timer in the controller determines that if there are no pulses from the encoder in a pre-selected time period, then the saw blade is at the feed point position and the controller sets the pulse count to zero when the carriage is retracting. The controller then activates pneumatic cylinder 76 to retract feed finger 70 from engagement with saw blade 14, again causing pulses from the encoder to be sent to the controller. When pneumatic cylinder 72 is fully retracted so that movement of carriage 64 stops, pulses from the encoder to the controller again stop. A timer determines that if there are no pulses from the encoder in a preselected time period, then the carriage is at the home position and the pulse count is again zeroed. At this point jaw 54 is clamped against saw blade 14.

The apparatus includes a means for ensuring that the sawteeth are always indexed to the proper feed point. This is accomplished by diverting the flow of pneumatic pressure from one flow control to another immediately prior to when the indexing mechanism reaches the feed point position. This slows the extension rate of pneumatic cylinder 72, thereby slowing the rate at which saw blade 14 is moved and ensuring that the saw tooth to be ground does not move beyond the feed point position. Thus, the controller detects when the feed point position is about to be reached according to the number of pulses detected from the encoder. At a predetermined point the pneumatic pressure to cylinder 72 is partially diverted, as described above.

If the operator determines that the apparatus is correctly adjusted, the automatic operation mode may be selected at the control system and automatic operation will begin. In the automatic mode, with the grind head assembly and indexing mechanism at their home positions, the clamp assembly is released. The saw blade is then indexed. When the feed point position is reached the saw blade is again clamped, the indexing mechanism is retracted to its home position and the grind head assembly is moved from its home position to the grind position.

As noted, a shock absorber 88 on grind head assembly 16 slows the rate of travel of the grind head immediately prior to the point where the grind wheels contact the sawtooth. This ensures that the grind wheels move across the sawtooth at the correct rate. A limit switch detects when the grind wheels have moved past the sawtooth, and once the tooth is thus ground, the controller activates cylinder 100, thereby pushing arbor mounting block 96a upwardly, away from the upper side of the sawtooth, and pushing arbor mounting block 96b downwardly away from the lower side of the sawtooth, as illustrated in FIG. 12, arrows B. The backlash in threaded shaft 114 allows the grind wheels 92 to be extended vertically away from the saw tooth. The limit switch also detects that the grinding operation is complete, and that the grind head assembly should be retracted from the grind position to the home position. With the rams of cylinder 100 still extended and the grind wheels still separated, grind head assembly 16 is retracted away from the grinding position to the home position. The amount of backlash in threaded shaft 114 is sufficient to allow grind wheels to clear the ground sawtooth without contact as the grind head moves from the grind position to the home position. Shock absorber 90 mounted at the rearward end of grinding head assembly 16 slows travel of the grind head assembly as it approaches the home position to eliminate banging. This cycle is repeated until the number of teeth input by the operator have been ground.

The described grinding apparatus could be modified such that the grinding wheels operate on a vertically oriented band saw loop, but grind the saw teeth on the portion of the blade loop that is vertically descending.

Having illustrated and described the principles of the invention in the preferred embodiment, it should be apparent to those skilled in the art that the invention can be modified in arrangement and detail without departing from such principles.

We claim all modifications coming within the spirit and scope of the following claims:

1. An apparatus for grinding the working portions of teeth of an endless band saw blade, comprising:

mounting means for movably mounting the saw blade in a single loop having a vertical orientation such that the blade can be moved in a path defined by the loop and such that the teeth of the blade project parallel to a horizontal ground plane at all positions along the path, the path including a horizontal path portion along an upper limit of the loop;

grinding means for grinding a tooth when the tooth is positioned along the horizontal path portion in a grinding position; and indexing means for moving the saw blade on the mounting means along the path to position successive teeth of the saw blade at the grinding position, the indexing means being selectively operable for moving a right-handed saw blade in one direction along the path portion and for moving a left-handed saw blade in the opposite direction along the path portion.

2. The apparatus of claim 1 wherein the indexing means comprises independently operable first and second indexing means, the first indexing means being mounted for moving the saw blade in the one direction, and the second indexing means operable for moving the saw blade in the opposite direction.

3. The apparatus of claim 1 wherein the grinding means is mounted for reciprocative movement toward and away from the sawtooth.

4. The apparatus of claim 3 wherein the grinding means includes elements for grinding a tooth held at the grinding position.

5. The apparatus of claim 3 including control means operable to sequentially:

(a) operate the indexing means to position successively teeth of the saw blade at the grinding position;

(b) operate the grinding means to grind successively the teeth positioned at the grinding position; and (c) repeat functions (a) and (b) in sequence to position and grind the working portion of the saw tooth until a preselected number of saw teeth are ground.

6. The apparatus of claim 5 wherein the control means further comprises programmable control means including means for determining when a tooth is at the grinding position relative to the grinding means.

7. The apparatus of claim 6 wherein the means for determining when a tooth is at the grinding position includes an encoder calibrated to activate an indexing finger to engage a saw tooth for indexing.

8. The apparatus of claim 1 further including clamping means for clamping a saw tooth in the grinding position.

9. The apparatus of claim 8 including control means selectively operable to sequentially:

(a) clamp a sawtooth in the grinding position while the grinding means grinds the teeth;

(b) release the ground sawtooth so the saw blade may be fed by the indexing means until the next successive tooth is at the grinding position, and (c) repeat functions (a) and (b) sequentially until a preselected number of sawteeth are ground.

10. The apparatus of claim 1 wherein the working portion comprises a cutting tip of a saw tooth, and the grinding means includes a pair of opposed rotary grinding elements positioned for grinding opposite sides of the cutting tip at predetermined radial and tangential clearance angles and mounted for movement toward and away from the tip.

11. An apparatus for side grinding the working portions of teeth of a band saw blade mounted on a support for movement in a circuitous path, comprising:

a pair of rotary grinding elements, the first grinding element being positioned and movable to grind one side of the working portion of a tooth, and the second grinding element being positioned and movable to grind the opposite side of the working portion of the same tooth when the tooth is in a selected grinding position along the path; and an indexing system for moving the saw blade along the path to position successive teeth of the saw blade at the selected grinding position, the indexing system being selectively operable to move a right-handed saw blade intermittently in one direction along the path to position successive teeth of the right-handed blade at a selected grinding position, and to move a left-handed saw blade intermittently in the opposite direction along the path to position successive teeth of the left-handed blade at a selected grinding position, such that the same said pair of grinding elements are operable to side grind the teeth of both left-handed and right-handed band saw blades movable along a common path of travel.

12. The apparatus of claim 11 wherein the indexing system comprises independently operable first and second indexing carriages, the first indexing carriage being mounted for moving a saw blade intermittently in the one direction, and the second carriage being mounted for moving a saw blade intermittently in the opposite direction.

13. The apparatus of claim 12 wherein the grinding elements are mounted for reciprocative movement toward and away from the sawtooth.

14. The apparatus of claim 12 wherein each indexing carriage includes a means for moving a saw blade through a variable distance corresponding to the distance between teeth of the saw blade to accurately position each tooth at the grinding position.

15. The apparatus of claim 13 including a programmable controller operable to sequentially:

(a) select either the first or the second indexing carriage according to input instructions, and to operate the indexing system and selected carriage to position successively teeth of the same saw blade at the selected grinding position;

(b) reciprocate the grinding elements between a home position and an element grinding position to grind successively teeth of the saw blade when the teeth are positioned at the grinding position by the indexing system; and (c) repeat functions (a) and (b) in sequence to position and grind the working portion of each successive saw tooth until a preselected number of saw teeth are ground.

16. The apparatus of claim 15 wherein the programmable controller includes means for determining when a tooth is at a selected grinding position.

17. The apparatus of claim 16 wherein the means for determining when a tooth is at the grinding position includes an encoder calibrated to activate an indexing finger to engage a saw tooth for indexing.

18. The apparatus of claim 11 further including a clamp operable to secure the saw blade when a sawtooth is in a selected grinding position.

19. The apparatus of claim 15 including a clamp for clamping the saw blade adjacent to a tooth to be ground when the tooth is in a selected grinding position, said programmable controller being programmed to:
   (a) clamp the saw blade after a sawtooth is indexed to the grinding position and before the grinding elements move to grind a tooth;
   (b) release the saw blade after the tooth is ground and the grinding elements move away from the tooth to enable the indexing system to index the next successive sawtooth to the grinding position, and
   (c) repeat functions (a) and (b) sequentially before and after, respectively, each tooth is ground until a preselected number of teeth are ground.

20. The apparatus of claim 11 wherein the grinding elements include a pair of opposed grinding wheels positioned for grinding opposite sides of the cutting tip, the wheels being mounted with their rims in opposition and there axes parallel on a common grinding head movable toward and away from a tooth in tis grinding position, the head being pivotal about a pivot axis that is parallel to the plane defined by the grinding wheel axes, the head including means for adjusting the spacing between opposed wheel rims to determine the final ground dimensions of a tooth and adjusted rim spacing for grinding, the head further including means for increasing the rim spacing beyond the adjusted rim spacing to enable the head to move away from a tooth after grinding without the wheels contacting the tooth.

21. An apparatus for grinding the teeth of both right-handed and left-handed band saw blades, comprising:
   mounting means configured for mounting both right-handed and left-handed band saw blades for movement in the same endless path such that a sawtooth of either of said blades can be moved to a grinding position in said path;
   grinding means operable for grinding a sawtooth of either of said saw blades while the sawtooth is maintained in a grinding position; and
   an indexing means comprising a first indexing carriage mounted for moving a right-handed saw blade on the mounting means in one direction along said path to position successive teeth of the right handed saw blade at a selected grinding position, and a second indexing carriage mounted for moving a left-handed saw blade on the mounting means in a direction opposite said one direction in said path to position successive teeth of the left handed saw blade at a selected grinding position.

22. An apparatus for grinding the teeth of both right-handed and left-handed band saw blades, comprising:
   mounting means configured for mounting both right-handed and left-handed band saw blades such that a sawtooth is in a grinding position;
   grinding means operable for grinding a sawtooth of the saw blade while the sawtooth is maintained in the grinding position, the grinding means including a pair of opposed grinding wheels mounted for grinding opposite sides of a saw tooth and a grinding head mounting the grinding wheels, and wherein the grinding head is mounted for movement toward and away from the sawtooth when the tooth is in the grinding position; and
   an indexing means comprising a first indexing carriage mounted for moving a right-handed saw blade on the mounting means to position successive teeth of the saw blade at a first selected grinding position, and a second indexing carriage mounted for moving a left-handed saw blade on the mounting means to position successive teeth of the saw blade at a second selected grinding position.

23. An apparatus for grinding the teeth of both right-handed and left-handed band saw blades, comprising:
   mounting means configured for mounting both right-handed and left-handed band saw blades such that a sawtooth is in a grinding position;
   grinding means operable for grinding a sawtooth of the saw blade while the sawtooth is maintained in the grinding position, the grinding means including a pair of opposed grinding wheels mounted for grinding opposite sides of a saw tooth and a grinding head mounting the grinding wheels, and wherein the grinding head is mounted for movement toward and away from the sawtooth when the tooth is in the grinding position wherein the grinding wheels are mounted for movement toward and away from a sawtooth in a direction transverse to the direction of movement of the grinding head toward and away from the sawtooth; and
   an indexing means comprising a first indexing carriage mounted for moving a right-handed saw blade on the mounting means to position successive teeth of the saw blade at a first selected grinding position, and a second indexing carriage mounted for moving a left-handed saw blade on the mounting means to position successive teeth of the saw blade at a second selected grinding position.

24. An apparatus for grinding the teeth of both right-handed and left-handed band saw blades, comprising:
   mounting means configured for mounting both right-handed and left-handed band saw blades such that a sawtooth is in a grinding position;
   grinding means operable for grinding a sawtooth of the saw blade while the sawtooth is maintained in the grinding position,
   an indexing means comprising a first indexing carriage mounted for moving a right-handed saw blade on the mounting means to position successive teeth of the saw blade at a first selected grinding position, and a second indexing carriage mounted for moving a left-handed saw blade on the mounting means to position successive teeth of the saw blade at a second selected grinding position, and;
   control means operable to sequentially:
      (a) operate either the first or the second indexing means according to preselected instructions to position successively teeth of the saw blade at the grinding position;
      (b) operate the grinding means to grind successively the teeth positioned at the grinding position; and
      (c) repeat functions (a) and (b) in sequence to position and grind the working portion of the saw tooth until a preselected number of saw teeth are ground.

25. A method of grinding the teeth of either right-handed or left-handed endless band saw blades, comprising the steps of:
   mounting a band saw blade in a vertical loop orientation for movement in either direction along a path defined by the loop past right-handed and left-handed grinding positions;
   indexing a right-handed saw blade in one direction along the path to position a tooth to be ground at the right-hand grinding position and indexing a left-handed saw blade in the opposite direction along the path to position a tooth to be ground at the left-hand grinding position;

clamping the tooth to be ground in its grinding position;

grinding the tip of the tooth;

unclamping the ground tooth; and indexing the same left- or right-handed saw blade in the same selected direction to position the next successive tooth of the saw blade at its grinding position, and repeating the clamping, grinding, unclamping and indexing steps as aforesaid until all teeth of the same saw blade have been ground.

26. The method of claim 25 including using a programmable controller to control sequential steps of indexing, clamping, grinding and unclamping.

27. A method of side grinding the teeth of an endless band saw blade to desired dimensions and side clearance angles comprising:

(a) mounting the endless blade in a single vertically oriented loop so that the teeth project horizontally from the band, and so that the blade can be readily moved along a path defined by the loop, with the path including a flat horizontal path portion at the top of the loop defining a work station for grinding each tooth, with the work station including a grinding position for each tooth;

(b) moving the blade along the path until a tooth is in the grinding position;

(c) with the tooth in grinding position and while supporting the blade along the flat horizontal path portion, clamping the blade at the work station adjacent the grinding position to stabilize the tooth;

(d) while stabilizing the tooth, advancing a pair of vertically opposed grinding wheels with parallel horizontal axes and their rims in opposition and spaced apart, horizontally toward the top of the tooth, with the angle of approach and position of the wheels relative to the tooth, and the rim spacing between wheels, all being preset to grind the desired radial and tangential clearance angles on the opposite sides of the tooth and the desired dimensions between opposite sides, and continuing to advance the wheels until the tooth is ground;

(e) while continuing to stabilize the tooth in its grinding position after grinding, spreading the wheels apart to increase rim spacing therebetween so that the wheels can be retracted horizontally from the tooth without contacting the tooth;

(f) while spreading the wheels apart and continuing to stabilize the tooth, retracting the wheels horizontally from the tooth to a home position;

(g) after the wheels are retracted, moving the wheels together to their preset rim spacing and unclamping the blade;

(h) then repeating steps (b) through (g) in sequence until all teeth on the blade are ground.

28. The method of claim 27 wherein the same steps are followed for grinding the teeth of both left-handed and right-handed saw blades except a left-handed blade is moved along the path in a direction opposite the direction of movement of a right-handed blade along the path to position each tooth of the blade in a grinding position, whereby the same mounting means, clamping means and grinding wheels can be used for grinding both left- and right-handed blades and only different indexing means are required.

29. A machine for grinding opposite sides of the cutting teeth of an endless band saw blade to final side clearance angles and dimensions, said machine comprising:

a blade mounting structure for mounting the blade in a single vertically oriented loop, for movement in a blade path defined by the loop, the structure including conveyer rolls supporting a bottom portion and horizontally opposite end portions of the blade loop;

a grinding head mounted laterally adjacent to a work table for linear movement in a horizontal head path transverse to the blade path and toward and away from the blade path between a home position and a grinding position, the grinding head also being mounted for pivotal movement about a vertical pivot axis;

a pair of vertically opposed and spaced apart grinding wheels mounted with their axes parallel to one another on the grinding head such that linear movement of the head between its home and grinding positions moves the grinding wheels into and out of their grinding positions relative to the blade path and such that pivotal movement of the head changes the angular relationship between the grinding wheels and the plane of the blade path;

a first adjustment on the head for adjusting the angular position of the head about its pivot axis and thus the angular positions of the grinding wheels relative to the blade path;

a second adjustment on the head for determining the vertical adjusted spacing between grinding wheels while grinding;

clearance means on the head for increasing the vertical spacing between the wheels from the adjusted spacing to allow the wheels to clear a tooth after grinding and while the head returns to its home position;

indexing mechanism associated with the work table for moving a band saw blade in the blade path to index a tooth to be ground to a predetermined tooth grinding position in the blade path; and a blade clamp associated with the work table for clamping the blade adjacent the tooth to be ground to stabilize the tooth when in the tooth grinding position.

30. The machine of claim 29 including:

a programmable controller to sequentially:
(a) activate the indexing mechanism to index a tooth to the tooth grinding position;
(b) activate the clamp to stabilize the tooth in the tooth grinding position;
(c) advance the grinding head from its home position to grind the tooth;
(d) operate the clearance means to increase the spacing between grinding wheels;
(e) retract the grinding head from its grinding position to its home position;
(f) operate the clearance means to return the wheels to their adjusted spacing; and
(g) repeat steps (a) through (f) until all teeth of a blade are ground.

31. The machine of claim 29 wherein:

the indexing mechanism includes a first indexer for indexing a right-handed blade in one direction along the blade path and a second indexer for indexing a left-handed blade in the opposite direction along the blade path, and means for selectively activating one or the other of said first and second indexers.

32. The machine of claim 29 including a fence associated with the work table for guiding movement of the blade across the table and positioning the blade on the table transversely relative to the grinding head, the fence being adjustably movable in a direction normal to the blade path.

* * * * *